(12) United States Patent
Vion-Dury

(10) Patent No.: US 7,146,604 B2
(45) Date of Patent: Dec. 5, 2006

(54) PROGRAM OPERATORS FOR COMPOSING ABSTRACTIONS

(75) Inventor: Jean-Yves Vion-Dury, Saint-Ismier (FR)

(73) Assignee: Xerox Corporation, Stamford, CT (US)

( * ) Notice: Subject to any disclaimer, the term of this patent is extended or adjusted under 35 U.S.C. 154(b) by 740 days.

(21) Appl. No.: 10/248,286

(22) Filed: Jan. 6, 2003

(65) Prior Publication Data

US 2004/0139422 A1 Jul. 15, 2004

(51) Int. Cl.
*G06F 9/45* (2006.01)

(52) U.S. Cl. .................................................. 717/120
(58) Field of Classification Search ................ 717/120
See application file for complete search history.

(56) References Cited

U.S. PATENT DOCUMENTS

| | | | | |
|---|---|---|---|---|
| 6,308,187 | B1 * | 10/2001 | DeStefano | 715/526 |
| 6,374,402 | B1 * | 4/2002 | Schmeidler et al. | 717/167 |
| 6,473,895 | B1 | 10/2002 | Lopes et al. | 717/128 |
| 2002/0089541 | A1 * | 7/2002 | Orbanes et al. | 345/764 |
| 2004/0148592 | A1 * | 7/2004 | Vion-Dury | 717/152 |

OTHER PUBLICATIONS

L. Cardelli and P. Wegner, "On understanding data types, data abstraction, and polymorphism", in ACM Computing Surveys, 17:471-522, Dec. 1985.

Circus-DTE Factsheet, available on the Internet at http://alphaave.com/staging/Xerox/Circus-DTE/tutorial/factsheet.pdf, in 2002.

Circus-DTE Tutorial, available on the Internet at http://alphaave.com/staging/Xerox/Circus-DTE/tutorial/tutorial.pdf in 2002.

J. Magee, J. Kramer, and N. Dullay, "Darwin/mp: An environment for parallel and distributed programming", in proceedings of 26th HICSS, vol. II (Software Technology), Jan. 1993.

R. Milner, "Operational and Algebraic Semantic of Concurrent Processes", in vol. 2, chapter Chap. 19, Handbook of Theoretical computer Science. Elsevier Publishers B.V., 1990.

G. D. Plotkin, "A structural approach to operational semantics", in Technical Report DAIMI-FN-19, Computer Sciences Dept, Arhus university, Denmark, 1981. (available on the Internet at http://www.dcs.ed.ac.uk/home/gdp/publications/).

M. Shaw, "Procedure calls are the assembly language of systems interconnection: Connectors deserve first-class statues", in Proceedings of the Workshop on Studies of Software Design, May 1993.

(Continued)

*Primary Examiner*—John Chavis

(57) ABSTRACT

Programming abstractions with at least one expression are composed to a single abstraction using a composition operator. Expressions from the abstractions are unfolded by removing the prefix of each abstraction and substituting formal parameter names in each expression with a common parameter name to define open variables. The unfolded expressions are transformed to a reduced expression using a composition pattern that tunes semantics of the composition operators. The reduced expression is nested in the single abstraction by: appending a selected prefix of the composed abstraction to the reduced expression, binding the open variables of the reduced expression to the formal parameter of the selected prefix, and computing the type of the formal parameter of the selected prefix.

20 Claims, 6 Drawing Sheets

OTHER PUBLICATIONS

Eugene Shcherbatyuk, "A language extension for programming abstractions without objects", Oct. 29, 2001, published on the Internet at http://www.modulaware.com/mdlt/mdlt84.htm.

"Towards The Clarification Of The Object-Oriented Concepts", available on the Internet at http://www.doc.mmu.ac.uk/STAFF/J.Gray/oopslang/aoblnts/intro/OOPCONCP.HTM, in 2002.

U.S. Appl. No. 10/046,314, entitled "Symmetrical Structural Pattern Matching" (D/A0858).

U.S. Appl. No. 10/046,191, entitled "Bi-Valuation Of Programming Statements" (D/A0858Q).

* cited by examiner

```
< label = " = ",
    left = "a",
    right = <
            label   =   " + ",
            left    =   "b",
            right   =   <
                        label   =   " * ",
                        left    =   "10",
                        right   =   "c"
                        >
            >
>
```

```
< label = " = ",
    left = "a",
    right = <
            label   =   ADD,
            left    =   "b",
            right   =   <
                        label   =   " * ",
                        left    =   "10",
                        right   =   "c"
                        >
            >
>
```

```
< label = " = ",                    702      704
    left = "a",                                    (=)
    right = <                                     /   \
        label = " + ",                           a    (+)
        left  = "b",                                 /   \
        right = <                                   b   (MUL)
            label = MUL,                                /   \
            left  = "10",                              10    c
            right = "c"
            >
        >
>
```

```
< label = " = ",                    802      804
    left = "a",                                    (=)
    right = <                                     /   \
        label = ADD,                             a   (ADD)
        left  = "b",                                 /   \
        right = <                                   b   (MUL)
            label = MUL,                                /   \
            left  = "10",                              10    c
            right = "c"
            >
        >
>
```

PROGRAM OPERATORS FOR COMPOSING ABSTRACTIONS

CROSS-REFERENCE TO RELATED APPLICATIONS

Cross-reference is made to U.S. patent application Ser. No. 10/046,314, entitled "Symmetrical Structural Pattern Matching", (now published as US 2003/0191847 A1), Ser. No. 10/046,191 entitled "Bi-Valuation Of Programming Statements", (now published as US 2003/0188297 A1), which are assigned to the same assignee as the present invention and incorporated herein by reference. Cross-reference is also made to concurrently filed U.S. patent application Ser. No. 10/248,287 entitled "Program Compiler With Abstraction Composer", (now published as US 2004/0148592 A1), which is assigned to the same assignee as the present invention and incorporated herein by reference.

BACKGROUND OF INVENTION

The present invention relates generally to software programming languages, and more particularly, to a programming language with operators adapted to compose programming abstractions.

Central to all programming languages is the concept of "programming abstractions". Programming abstractions as used herein describe functional behavior in computer programs through, for example, functions, procedures, or methods. Programming abstractions have the qualities of software code embedding, factorization, and reuse.

Code embedding refers to the use of programming abstractions (also referred to herein as "abstractions") as building blocks, where abstractions are able to call each other. Code factorization refers to the avoidance of code duplication associated with abstractions in a program. Code reuse refers to the avoidance of duplicating abstractions to develop additional functionality.

More specifically, code factorization avoids the duplication of "n" similar code segments if they are needed at "n" different locations in a software program. These different segments can be transformed into a common abstraction which can be invoked "n" times at a single location in the software program. This operation is called an abstraction because some of the programming instructions are changed in order to operate on variables instead of values. These variables constitute the execution environment of the abstraction, where the value of the variables is specified at runtime.

For example, the operation "10+1" can be abstracted into an abstraction called a λ-abstraction (i.e., lambda-abstraction) that has the form "λ x:int.x+1", where 10 is now defined as the variable "x" of type integer (i.e., "int"). In effect, the lambda-abstraction has generalized the operation "10+1" making it applicable to any integer, instead of a constant (e.g., 10).

Consequently if this lambda-abstraction is called "F", then F (10) will compute 11 and F (11) or F (F(10)) will compute 12.

It is therefore advantageous to define computer programs using abstractions to simplify software design by breaking down a complex monolithic program into smaller subprograms. In addition, programming using abstractions has the additional benefit of simplifying quality assurance testing. For instance, testing a plurality of small sub-programs is easier than testing a large monolithic program because the context of each sub-program is more explicit and the branching complexity is simplified.

Besides code factorization, abstractions enable code reuse. That is, previously created abstractions can be reused when new software is developed by programmers. The reuse of abstractions may be as simple as copying abstractions from a repository of abstractions or from an existing program. In addition, the reuse of abstractions may involve the use of function previously created to create new function.

The creation of a new abstraction that combines the function of two or more existing abstractions is defined herein as the "composition of programming abstractions". Current software programming techniques are poorly adapted to facilitate the composition of abstractions in a structured and a formal manner; indeed, existing techniques achieve reuse through two basic techniques that simply reuse existing approaches for composing operators that work either by duplicating code defining abstractions or by directly calling abstractions (e.g., by nesting calls). These current techniques for composing abstractions results in the production of unnecessary code at compile time.

For example, assume an existing ∇-abstraction (i.e., nabla-abstraction) "P" that takes any integer "x" and computes its double as output "y" is defined as "P=∇x:int, y:int.(y:=2*x)". Existing techniques for creating a new abstraction "PP" that encapsulates two subsequent calls to the abstraction "P" would be defined as "PP=∇x:int, y:int.(y:=P(P(x)))". Execution of the composed abstraction PP(3) would produce 12. However this method for composing abstractions could be more efficient because P(P(x)) requires more instructions than necessary to carry out the operation.

Accordingly, it would be desirable to provide a programming language and compiler adapted to compose programming abstractions. Such a programming language and compiler would advantageously speed and simplify program development and maintenance by facilitating the combination of existing abstractions in a structured and formal manner.

SUMMARY OF INVENTION

In accordance with the invention, there is provided program operators, and a compiler therefor, for composing programming abstractions. Advantageously, the program operators for composing abstractions provide a definitional framework that shows that abstractions are reused and the manner in which they are reused, simplifying program maintenance through increased legibility. In addition, the compilation of the composition of abstractions using the program operators produces a composed abstraction after compilation that is functionally equivalent to existing approaches for composing operators but computationally different, thereby increasing program efficiency at runtime.

For example, composing the existing delta-abstraction "P" (defined above) using a composition operator "pipe" (described in detail below) results in source code that defines a new abstraction as "PP'=P pipe P". This definition explicitly shows the reuse of programming abstractions in the source code. In addition after compilation, the abstraction PP' reduces to "PP'=∇ x:int , y: int .( var a=0.a:=2*x; y:=2*a)" which is functionally equivalent yet computationally more efficient than the abstraction PP (defined above).

In accordance with one aspect of the invention, there is provided a method, apparatus and article manufacture therefor, for composing programming abstractions. A composition operation is defined for composing a first abstraction and a second abstraction with a selected composition operator. Each abstraction has a form, a prefix, and at least one expression. The expressions from the first and the second-abstractions are unfolded by: removing the prefix of each abstraction, and substituting formal parameter names in each expression with a common parameter name to define open variables. The unfolded expressions are transformed to a reduced expression using a composition pattern that tunes semantics of the selected composition operator. A prefix is selected that depends on the selected composition operator and the form of the first abstraction and the second abstraction. The selected prefix has a formal parameter with a type. The reduced expression is nested in a third abstraction that composes the first abstraction and the second abstraction by: appending the selected prefix to the reduced expression, binding the open variables of the reduced expression to the formal parameter of the selected prefix; and computing the type of the formal parameter of the selected prefix.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

Outline of Detailed Description

Figure 1:
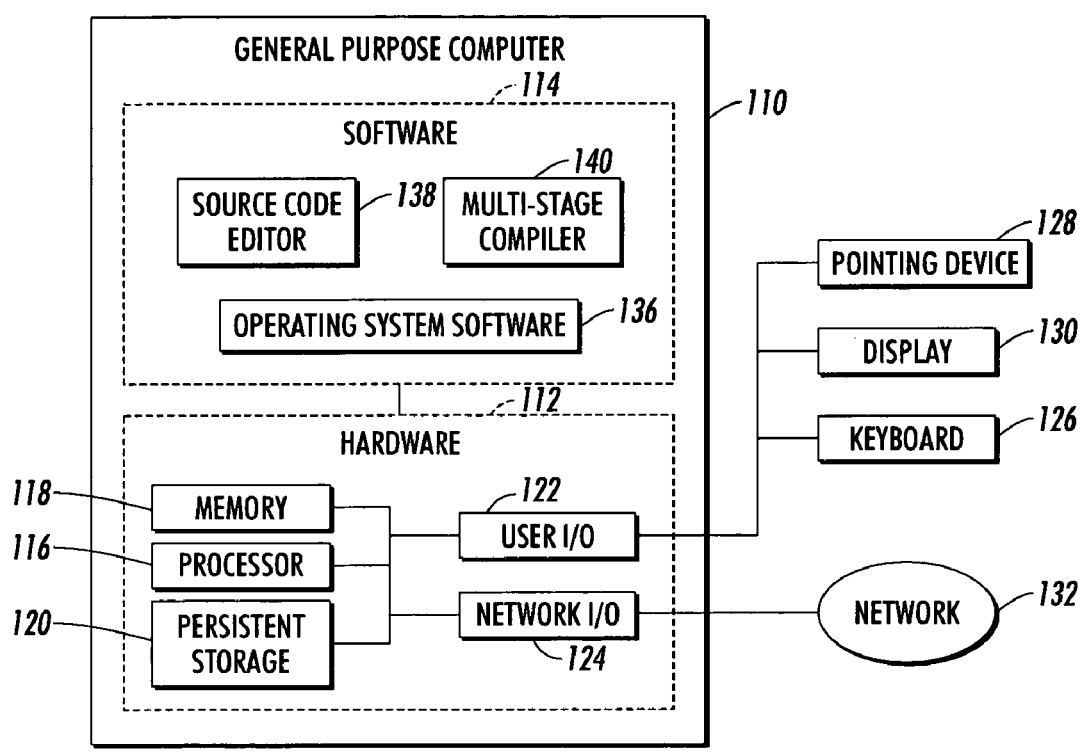
FIG. 1 illustrates a general purpose computer for carrying out the present invention.

A. Operating Environment
A.1 Multi-Stage Compiler
A.2 Method For Composing Operators
A.3 Detailed Example
B. General Syntax and Operational Semantics
C. Type System
C.1 Defining Sub-Type Relations
C.2 Typing Rules For Defining Well Typed Properties of Terms
D. The Composition of Functional Abstractions
D.1 Typing Of Composition Operators
D.2 Computational Equivalence
D.3 Application To The Computation Of Numerical Series
D.4 Handling Subtype Polymorphism (Generalization)
E. Extending the Calculus with Imperative Expressions
E.1 Computing Environment
E.2 Syntactic Expressions
E.3 Operational Semantics
E.4 Type System
F. Polymorphic Composition of Nabla-Abstractions
F.1 Semantics
F.2 Typing
G. A Set of Composition Operators
H. Safety Properties Of The Calculus
H.1 General Type Preservation Property
H.2 Strong Type Soundness Of The Core Calculus
H.3 Weak Type Soundness Of The Whole Calculus C/F (E)
I. Polymorphic Composition of Records
I.1 Definition
I.2 Using Record Polymorphism In Pam Composition
J. Illustration of a Modeling Tree Transformer
K. Miscellaneous A. Operating Environment FIG. 1 illustrates a general purpose computer 110 for carrying out the present invention. The general purpose computer 110 includes hardware 112 and software 114. The hardware 112 is made up of a processor (i.e., CPU) 116, memory 118 (ROM, RAM, etc.), persistent storage 120 (e.g., CD-ROM, hard drive, floppy drive, tape drive, etc.), user I/O 122, and network I/O 124. The user I/O 122 can include a keyboard 126, a pointing device 128 (e.g., pointing stick, mouse, etc.), and the display 130. The network I/O 124 may for example be coupled to a network 132 such as the Internet.

The software 114 of the general purpose computer 110 includes an operating system 136, a source code editor (and debugger) 138, and a multi-stage compiler 140. The operating system 136 permits processor 116 to allow a user of the general purpose computer 110 to compose source code using the source code editor 138. The source code, which is stored in either memory 118 or persistent storage 120, is compiled by the multi-stage compile 140.

A.1 Multi-Stage Compiler

Figure 2:
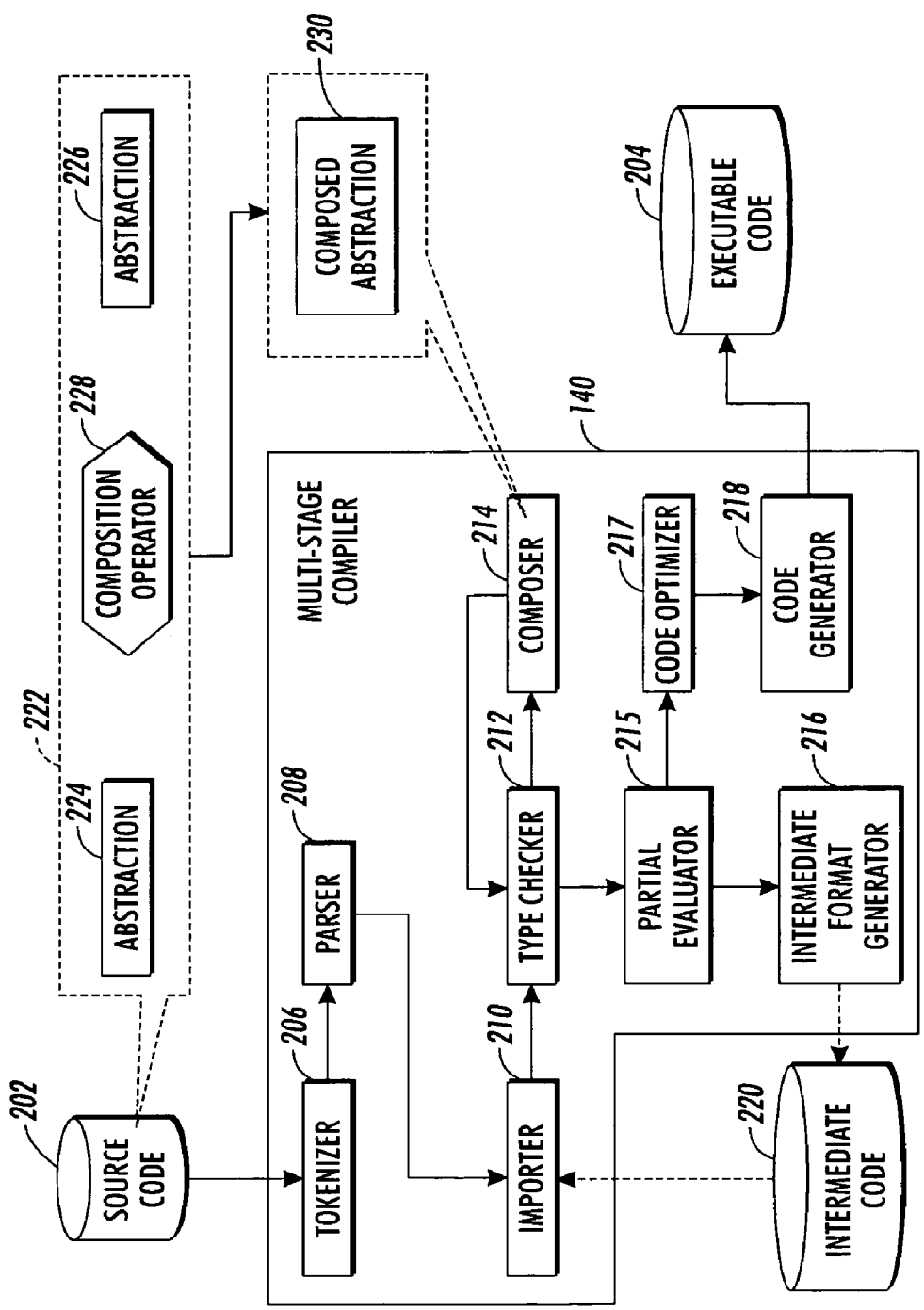
FIG. 2 illustrates a detail view of the multi-stage compiler shown in FIG. 1.

FIG. 2 illustrates a detail view of the multi-stage compiler shown in FIG. 1. The multi-stage compiler includes a tokenizer 206, a parser 208, an importer 210, a type checker 212, a composer 214, a partial evaluator 215, an intermediate format generator 216 that generates intermediate code 220, a code optimizer, and a code generator 218 that generates executable code 204, the details of which are described below.

The multi-stage compiler 140 takes as input source code 202 and produces as output executable code 204. The multi-stage compiler may either operate statically (i.e., during a composition or analysis stage of language processing) or dynamically (i.e., during execution of the executable code). The code generator 218 may produce: executable code that constitutes machine specific operating instructions (i.e., op-codes), byte-codes that may be executed on an interpreter, or a combination of op-codes or byte-codes.

In accordance with the invention, the source code 202 is formulated with at least one abstraction composition operation 222 using for example the source code editor 138, which may be any conventional text editing program. In general, the abstraction composition operation that is defined in the source code 202 composes at least a first abstraction 224 and a second abstraction 226 using a composition operator 228.

During compilation of the source code 202, the composer 214 in the multi-stage compiler 140 reduces the abstraction composition operation 222 to a new abstraction 230. The composed abstraction 230 is later compiled into an executable form by the other elements of the multi-stage compiler 140 as described in more detail below.

In operation, the multi-stage compiler 140 receives as input source code 202 that is formulated with at least one instruction composing two abstractions (e.g., as shown at 222). Recognition of the contents of the source code is broken into two stages. Initially, the tokenizer 206 segments the source code into a sequence of tagged segments. The tagged segments are used by the parser 208, which is concerned with the structure of the source code, to build a concrete tree. The resulting concrete tree is in computable form and contains all of the useful information forming part of the source code that is necessary to formulate executable or intermediate code.

After tokenizing and parsing at 206 and 208, elements referred to in the source code that are external to the source code are resolved by the importer 210 by accessing the intermediate code 220. Subsequently, the type checker 212 applies a type checking process to the concrete tree. The type checking process traverses an abstract representation (i.e., an abstract tree) of the concrete tree, possibly in multiple passes, and decorates the abstract tree with types that add information related to the type of expressions on the abstract tree using the parsing and tokenizing information to define a decorated tree. In addition, the type checker 212 determines whether an expression is "well typed", using known methods for type checking that allows finding, legitimizing, and propagating types.

The type checker 212 delegates the processing of abstraction composition operations (e.g., abstraction composition operation 222) that are on the decorated tree to the composer 214. Thus, when the type checker 212 detects that some expressions in the source code are defined through composition operators, the type checker 212 passes the decorated tree for processing by the composer 214. The composer 214 reduces the abstraction composition operation 222 on the decorated tree into a new composed abstraction 230 that is decorated with types.

The new expressions and types added to the decorated tree by the composer 214 are then evaluated by the type checker 212 to determine whether those new expressions are well typed. In accordance with the invention, the composition of two abstractions may take place if the resulting composition is well typed. The type system described herein defines a framework for determining whether a composed expression is well typed as defined below. Generally, a well-typed expression satisfies a weak type soundness property, which provides that each transition step preserves typing.

The type checker 212 has the ability to accept subtypes and uses the type system defined below to distinguish the typing of abstractions. For example, the type system distinguishes between non-recursive and recursive abstractions. The advantage of distinguishing between these two types of abstractions is that it increases the precision of the type checking system, thereby allowing the type checker 212 to assert that the composed abstraction 230 is the correct composition of the abstraction composition operation 222.

Once all composition operations have been processed and determined to be well typed, the type checker 212 passes the decorated tree to the partial evaluator 215 which pre-evaluates language instructions in the decorated tree to reduce their complexity. The decorated tree is then evaluated by the intermediate format generator 216 to generate intermediate code 220 (i.e., a linear form of the decorated tree) for later importation by other programs. In addition, the decorated tree is evaluated by the code optimizer 217, which further evaluates the language instructions in the decorated tree to optimize certain aspects (e.g., new syntactic figures that may issue from the composition operation). Advantageously, the optimization performed by the code optimizer 217 takes place after composition by the composer 214, thereby further optimizing any composed abstractions it generates. The decorated tree is then input to the code generator 218 to generate executable code 204 (i.e., object code) for execution, for example, by processor 116 of the general purpose computer 110.

It will be appreciated by those skilled in the art that functional languages (e.g., ML family), which do not use explicit typing, may use the composition operators described herein without having to specify type operations. In an alternate embodiment of the multistage compiler 140, the type of expressions is deduced entirely from the expressions themselves using a modified type checker that guesses (i.e., infers) the best types. In this alternate embodiment, the multi-stage compiler 140 accommodates such functional languages by having the modified type checker reevaluate the decorated tree after being processed by the composer 214 to re-infer types.

A.2 Method for Composing Operators

Figure 3:
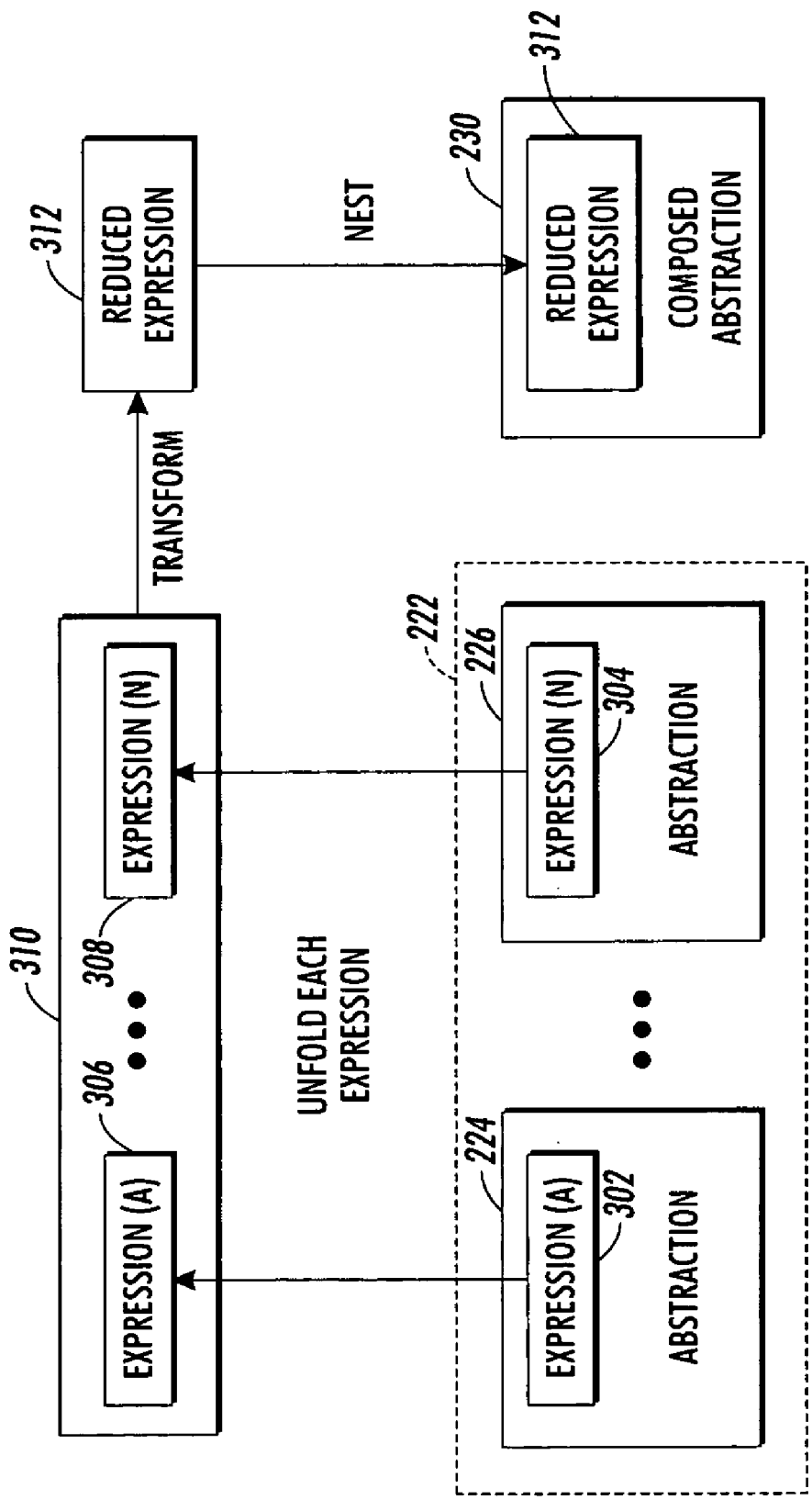
FIG. 3 illustrates a logical outline of a method for performing an abstraction composition operation shown in FIG. 2.
Figure 4:
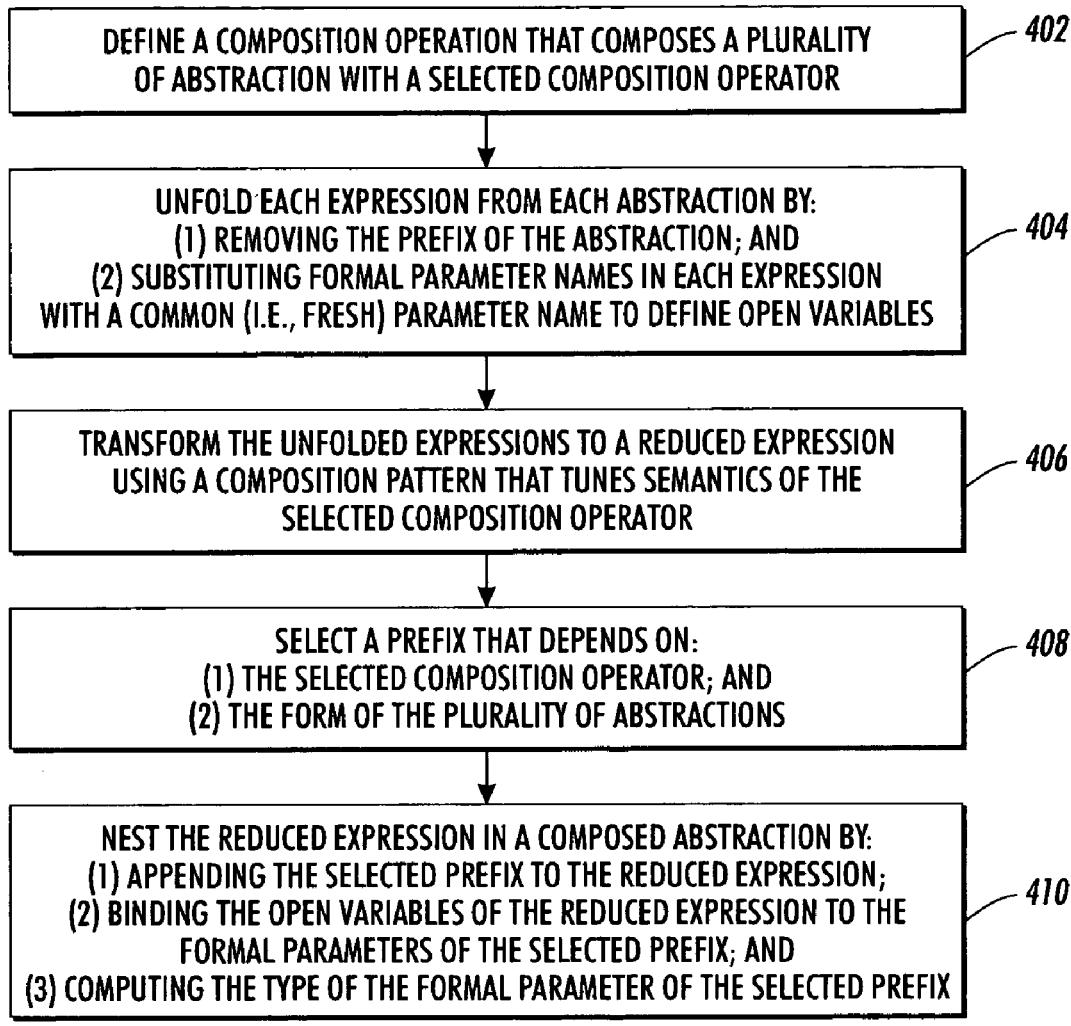
FIG. 4 is a flow diagram of the acts performed in the logic outline shown in FIG. 3 for carrying out the composition of abstractions.

FIG. 3 illustrates a logical outline of a method for performing the abstraction composition operation 222 shown in FIG. 2 that is performed by the composer 214. FIG. 4 is a flow diagram of the acts performed in the logic outline shown in FIG. 3 for carrying out the composition of a plurality of abstractions. FIGS. 3 and 4 are referred to simultaneously below.

Initially at 402 in FIG. 4, a composition operation that composes a plurality of abstractions with a composition operator is defined as shown in FIGS. 2 and 3 at 222. It will be appreciate that the composition operation 222 could include two or more abstractions that are composed according to one or more composition operators.

Composition operators are defined below using the symbols: ▣, ⊠, ⬚, ▦, and ◪. Each composition operator may have a subscript "E" (e.g., ▣$_E$) that defines a "composition pattern" that is used to tune the semantics of the composition operator. The absence of the composition pattern "E" in the subscript of a composition operator (e.g., ◪) indicates that the composition pattern "E" is an identity pattern (i.e., no tuning is performed to the semantics of the composition operator).

In addition, the composition operator may specify a "type combination relation" in its superscript. The type combination relation describes the manner in which parameter types of the composition operator are to be combined. One type combination relation is specified for each parameter defined by the composition operator. Each type combination relation specified indicates how to determine the type a parameter of the composed abstraction will take. As defined herein, the type combination relation is defined using the symbols $\oplus$, which represents the lowest common subtype, and $\otimes$, which represents the greatest common subtype, and the symbols * and $\diamond$, that range over $\{\oplus, \otimes\}$. The absence of either of these symbols in the superscript of a composition operator indicates that the types during the composition of the parameters do not change.

At 404 in FIG. 4, each expression (e.g., 302 and 304) in each abstraction (e.g., 224 and 226) defined in the abstraction composition operation 222 are unfolded. Unfolding an expression from an abstraction involves: (a) removing the prefix of the abstraction and (b) substituting formal parameter names in each expression with a common (i.e., fresh) parameter name to define open variables. In some embodiments, the formal parameter names may be substituted for more than one common parameter name. Act 404 in FIG. 3 is illustrated in FIG. 3 by unfolding the expressions 302 and 304 into the expressions 306 and 308, respectively.

At 406 in FIG. 4, the unfolded expressions (e.g., expressions 310) are transformed to a reduced expression (e.g., reduced expression 312) using a composition pattern that tunes the semantics of the composition operator. In some instances, this transformation may introduce information that specifies how to combine parameter types. Also in some instances, this transformation may involve using a composition pattern that is an identity pattern.

At 408 in FIG. 4, a prefix is selected (i.e., the selected prefix) that depends on (a) the composition operator and (b) the form of the plurality of abstractions. Abstractions may take one of four forms: a λ-abstraction, a ∇-abstraction, and their recursive variants (which are all defined in detail below). The selected prefix has at least one formal parameter with a type.

At 410 in FIG. 4, the reduced expression (e.g., reduced expression 312) is nested in a composed abstraction (e.g., composed abstraction 308) by: (a) appending the selected prefix (selected at act 408) to the reduced expression; (b) binding the open variables of the reduced expression (introduced at act 404) to the formal parameter of the selected prefix; and (c) computing the type of the formal parameter of the selected prefix in accordance with the type combination relation specified for the composition operator.

A.3 Detailed Example

The following example illustrates the composition of two abstractions Abs1 and Abs2 using the composition operator ⊡ defined at [c1] below as:

$$(z \text{ fresh}) \frac{E(\langle e_1[z/x_1]\rangle)\cdots(\langle e_n[z/x_n]\rangle)\twoheadrightarrow^\circ e}{\boxdot_E^\otimes (\lambda x_1:t_1.e_1, \ldots, \lambda x_n:t_n.e_n) \to \lambda z:t^x.e} \quad [c1]$$

where:

"$\lambda x_n:t_n.e_n$" is a lambda abstraction with prefix "λx:t", in which "λ" identifies a form of abstraction, "x" identifies a formal parameter (i.e., a parameter encapsulated in an abstraction) of type "t", and "e" is the expression of the abstraction, "$e_n[z/x_n]$" means substitute $x_n$ for z in the expression $e_n$, "$\twoheadrightarrow^\circ$" means the terminal form of an operation (i.e., after possibly several operational steps) reduces to a value, "⊗" identifies a type combination relation that specifies the greatest common subtype relation, "$e_1\langle e_2\rangle$" defines a lazy application in which the expression $e_2$ is passed by a function without first being computed, and "E" is a composition pattern (i.e., a lambda term that parameterizes the composition operation $\boxdot_E(e_1, \ldots, e_n)$).

Assuming in this example the lazy application "$e_1\langle e_2\rangle$" is given by a [β₁] reduction defined as:

$$\lambda x:t.e_1\langle e_2\rangle \to e_1[e_2/x] \quad [\beta_1]$$

Also assuming in this example that the abstractions Abs1 and Abs2 are given by:

Abs1=λx:any .x (where x is a formal parameter of type "any"), and

Abs2=λx:int. 1 (where x is a formal parameter of type "int").

Further assuming in this example that the composition pattern "E" of the composition operation $\boxdot_{Sub}\otimes$ is given by:

Sub≡λx:int.λy:int.x−y

Given the above assumptions, the composition of the abstractions Abs1 and Abs2 is expressed as (i.e., at act 402 in FIG. 4):

$\boxdot_{Sub}\otimes$(Abs1, Abs2)=$\boxdot_{Sub}\otimes$ (λx:any .x, λx:int. 1).

Initially the expressions e of each abstraction are unfolded in accordance with the general form $E\langle e_1[z/x_1]\rangle \cdots \langle e_n[z/x_n]\rangle$ by (a) removing the prefix (e.g., "λx:any" and "λx:int") of each abstraction (i.e., at act 404(1) in FIG. 4) and (b) substituting the formal parameter name "x" in each expression with a common (i.e., fresh) parameter name "z" to provide the unfolded expression (e.g., (i.e., at act 404(2) in FIG. 4):

Sub$\langle x[z/x]\rangle\langle 1[z/x']\rangle$.

Transforming the unfolded expression using the composition pattern Sub provides a reduced expression (i.e., at act 406 in FIG. 4) initially in the form (after substituting "x" for "z" in the expression "e" given by "e[z/x]"):

Sub$\langle z\rangle\langle 1\rangle$, which after expanding in accordance with the composition pattern Sub provides:

λx:int.y:int.x−y$\langle z\rangle\langle 1\rangle$, which after applying z to x in accordance with [β₁] reduction reduces to:

λy:int.z−y$\langle 1\rangle$, and which after applying 1 for y in accordance with [β₁] reduction reduces to the reduced expression (called "e"):

z−1.

A prefix is selected with a value that depends on the composition operator (e.g., ⊡) and the form of the plurality of abstractions (e.g., Abs1 and Abs2). For this example the selected prefix is "λx:???" (i.e., at act 408 in FIG. 4). Finally, the reduced expression is nested in an abstraction by appending the selected prefix (i.e., at act 410(1) in FIG. 4) as follows:

λx:???.z−1, and binding the open variable "z" to the formal parameter "x" of the selected prefix (i.e., at act 410(2) in FIG. 4) as follows:

λz:???.z−1, and computing the type of the formal parameter of the selected prefix in accordance with the greatest common subtype relation of types "any" and "int" (e.g., any ⊗int≡int) (i.e., at act 410(3) in FIG. 4) as follows to provide the composed abstraction:

λz:int.z−1.

B. General Syntax and Operational Semantics

Operational semantics is described herein using the SOS style described in G. Plotkin's article "A structural approach to operational semantics", Technical Report DAIMI-FN-19, Computer Sciences Dept., Århus university, Denmark, 1981, considering "small step" transitions in order to cover an eventual extension to concurrent languages with interleaving semantics.

A set of definitions is provided of a general abstract syntax of expressions "e" that describes basic constructs for terms of the underlying programming language, where the notation of "e" encompasses imperative and functional expressions. The first set defined in this section specifies functional expressions and the second set defined below in section E specifies imperative expressions.

An "imperative expression" as used herein generally means an expression that involves several sequential computational steps. A "functional expression" as used herein generally means an expression that allows "functional style" programming (i.e., programming that allows solution of problems to be found by defining functions and applying parameters to those functions).

Functional expressions "e", with types "t", defined herein include:

| | |
|---|---|
| e ::= n \| x \| s \| | numerical values, variables, string litterals |
| e*e \| | basic operations (* ∈ {+, −, *}) |
| if e then e else e \| | alternation |
| λx:t.e \| fixf(x:t)=e \| | typed lambda abstraction and recursive variant |
| e(\|e\|) \| e(e) \| | lazy and strict application |
| e ::= true \| false \| | boolean literals |
| e == e \| e > e \| | comparisons |
| t ::= int \| string \| bool \| | primitive types |
| t\|t \| | union of types |
| T \| ⊥ \| t → t \| t →→ t | top and bottom type, functions, recursive functions |

The definition of two different applications are described herein: the first definition of "application" (i.e., $e_1(\!|e_2|\!)$) allows lazy application whereas the second definition of "application" (i.e., $e_1(e_2)$) allows strict application (i.e., where the parameter must be normalized to a value before substitution, where a value is defined herein as a Boolean or numerical literal, or a (recursive) lambda abstraction).

As used herein, a transition system describes an interpreter of the language through a transition relation which defines the computation of any expression e into a new expression e', and is noted e→e'. Also, several computation steps such as e→e'→e" are abbreviated herein using the notation e→→e". Normalizing computations will reduce the expression e to a term e' which cannot be further reduced; this particular computation step is noted e→○e' and formally defined by:

$$\frac{e \to e' \quad e' \not\to}{e \to o \; e'} [\text{norm}]$$

By convention, values are noted v or n, s if they are numeric or string constants. A derivation chain that reduces to a value is noted e→→○v. The notation e→∗e' is used herein for derivation paths of zero or more steps transforming e in e'.

The following equations define the testing operation semantics:

if true then $e_2$ else $e_3 \to e_2$ [if1]

if false then $e_2$ else $e_3 \to e_3$ [if2]

$$\frac{e_1 \to e_1'}{\text{if } e_1 \text{ then } e_2 \text{ else } e_3 \to \text{if } e_1' \text{ then } e_2 \text{ else } e_3} [\text{if3}]$$

The semantics of operations on basic types is without surprise defined as (where the meta symbol is given by $* \in \{+,-,*,>,==\}$, and where $\varepsilon$ evaluates numeric literals into integer):

$$\frac{e_1 \to e_1'}{e_1 \star e_2 \to e_1' \star e_2} [\text{left-}\star]$$

$$\frac{e_2 \to e_2'}{v \star e_2 \to v \star e_2'} [\text{right-}\star]$$

$$\frac{\varepsilon(n_3) = \varepsilon(n_1) + \varepsilon(n_2)}{n_1 + n_2 \to n_3} [\text{add}]$$

$$s_1 + s_2 \to s_1 s_2 [\text{cat}]$$

$$\frac{\varepsilon(n_3) = \varepsilon(n_1) \times \varepsilon(n_2)}{n_1 * n_2 \to n_3} [\text{mul}]$$

$$\frac{\varepsilon(n_3) = \varepsilon(n_1) - \varepsilon(n_2)}{n_1 - n_2 \to n_3} [\text{sub}]$$

Note for the definitions [eq] and [neq] below, the symbol "$=^\alpha$", which is known as alpha-equivalence in the lambda calculus theory, is the syntactic equality, up to alpha-substitution (as set forth at the beginning of section D.2 below).

$$\frac{v_1 =^\alpha v_2}{v_1 == v_2 \to \text{true}} [\text{eq}]$$

$$[\text{eq}] \frac{\neg (v_1 =^\alpha v_2)}{v_1 == v_2 \to \text{false}} [\text{neq}]$$

$$\frac{\varepsilon(n_1) > \varepsilon(n_2)}{n_1 > n_2 \to \text{true}} [\text{gt}]$$

$$\frac{\varepsilon(n_1) \leq \varepsilon(n_2)}{n_1 > n_2 \to \text{false}} [\text{ngt}]$$

Both lazy and strict application evaluate left argument first:

$$\frac{e_1 \to e_1'}{e_1(e_2) \to e_1'(e_2)} [@_1]$$

$$\frac{e_1 \to e_1'}{e_1(e_2) \to e_1'(e_2)} [@_2]$$

The strict application requires (a) a normalized left term and (b) evaluating the parameter before substitution, while lazy application substitutes terms directly.

$$\frac{e_2 \to e_2'}{v(e_2) \to v(e_2')} [@_3]$$

$$\lambda x:t.e_1(v) \to e_1[v/x] \quad [\beta_2]$$

$$\lambda x:t.e_1(\!|e_2|\!) \to e_1[e_2/x] \quad [\beta_1]$$

Application on recursive abstractions "f" is performed towards two substitutions: the rewriting of the recursion variable by the recursive abstraction itself and then the usual substitution of the parameter.

$$\text{fix} f(x:t)=e(v) \to e[\text{fix} f(x:t)=e/f][v/x] \quad [\beta_3]$$

As usual in lambda calculi, the substitution operation involved in $[\beta_1]$, $[\beta_2]$ and $[\beta_3]$ must avoid name capture.

C. Additional Type System

Composition operators operate over types. The typing rules set forth below define well typed properties of types.

In one embodiment, the type checker 212 includes instructions that determine whether an expression is well typed using a series of logical operations that verify whether an expression is weakly sound in accordance with the typing rules defined herein.

C.1 Defining Sub-Type Relations

Accordingly, this section defines sub-type relations (i.e., subtype properties of types). That is, this section defines how types propagate during composition. More specifically, this section presents a formal type system including a (reflexive and transitive) subtype relation $t_1 \preccurlyeq t_2$ (which provides $t_1$ is a subtype of $t_2$), with basic axioms for all type t and expression e. The subtype relations [top] and [bot] are defined as:

$$t \preccurlyeq T [\text{top}] \perp \preccurlyeq t \quad [\text{bot}]$$

Typing assertions are noted herein as e:t (i.e., expression e has type t). A typing environment $\gamma$ may contain typing assertions over variables, and is used through the $\gamma \triangleright e:t$ notation, where "$\triangleright$" provides that expression e has type t in environment $\gamma$. Typically environment $\gamma$, x:t means that the current environment contains the assertion that variable x has type t. The typing assertion [sub] is defined as:

$$\frac{\gamma \triangleright e : t_1 \quad t_1 \preccurlyeq t}{\gamma \triangleright e : t} [\text{sub}]$$

The proposed notations distinguishes between "exact" typing (e::t) and typing by subsumption (e:t). This allows more precise type control, thereby avoiding over generalizing influences due to so called subsumption rule (see [sub] above), while preserving the convenience of subtyping mechanism. The union type provides a simple way to construct a super type by aggregating two types.

$$\frac{\gamma \triangleright e :: t}{\gamma \triangleright e : t} [\text{Min}] \quad \frac{t_1 \preccurlyeq t \quad t_2 \preccurlyeq t}{t_1 | t_2 \preccurlyeq t} [U1]$$

$$\frac{t \preccurlyeq t_1}{t \preccurlyeq t_1 | t_2} [U2] \quad \frac{t \preccurlyeq t_2}{t \preccurlyeq t_1 | t_2} [U3]$$

The proposed type system makes use of two relations over types.

Definition 1: Greatest common subtype $\otimes$.

Let $\mathcal{L}$ be the language generated by the grammar of types, where $\otimes$ is a total mapping from $\mathcal{L} \times \mathcal{L}$ into $\mathcal{L}$ such that:

$\forall t_1, t_2 t_1 \otimes t_2$ is the greatest common subtype of $t_1$ and $t_2$.

Definition 2: Lowest common supertype $\oplus$.

Let $\mathcal{L}$ be the language generated by the grammar of types, where $\oplus$ is a relation from $\mathcal{L} \times \mathcal{L}$ into $\mathcal{L}$ such that:

$\forall, t_2 t_1 \oplus t_2$ is the greatest common subtype of $t_1$ and $t_2$.

Note that common subtypes or super types always exist because of the definition of T and $\perp$ types. The $\oplus$ relation (used for instance in the [If] rule) is more abstract than the type union, since for instance int $\oplus$ string is either int|string or int|string|int. The [If] rule allows therefore precise and flexible typing of conditional statements, and the same for lambda abstractions (i.e., rules [f2,f2b] and [Fix,Fixb]).

The structural equality allows a natural treatment of types and their properties.

Definition 3: Structural type equality.

$$t_1 = t_2 \Leftrightarrow t_1 \preccurlyeq t_2 \text{ and } t_2 \preccurlyeq t_1$$

C.2 Typing Rules for Defining Well Typed Properties of Terms

The following set of typing equations covers additional logical assertions needed to handle the static semantics of the defined calculus ($* \in \{+,-,*\}$). (Note that $\emptyset \triangleright$ indicates that no typing context information is necessary.)

$$\emptyset \triangleright \text{true}::\text{bool} \quad [b1]$$

$$\emptyset \triangleright \text{false}::\text{bool} \quad [b2]$$

$$\emptyset \triangleright n::\text{int} \quad [i]$$

$$\emptyset \triangleright s::\text{string} \quad [s]$$

$$\gamma, x:t \triangleright x::t \quad [\text{var}]$$

$$\frac{t_3 \preccurlyeq t_1 \quad t_2 \preccurlyeq t_4}{t_1 \to t_2 \preccurlyeq t_3 \to t_4} [\text{fsub}]$$

$$\frac{t_3 \preccurlyeq t_1 \quad t_2 \preccurlyeq t_4}{t_1 \twoheadrightarrow t_2 \preccurlyeq t_3 \quad t_4} [\text{fsub2}]$$

$$\frac{\gamma \triangleright e_1 : \text{bool} \quad \gamma \triangleright e_2 :: t_1 \quad \gamma \triangleright e_3 :: t_2}{\gamma \triangleright \text{if } e_1 \text{ then } e_2 \text{ else } e_3 :: t_1 \oplus t_2} [\text{If}]$$

$$\frac{\gamma \triangleright e_1 : \text{string} \quad \gamma \triangleright e_2 : \text{string}}{\gamma \triangleright e_1 + e_2 :: \text{string}} [s-+]$$

$$\frac{\gamma \triangleright e_1 : \text{int} \quad \gamma \triangleright e_2 : \text{int}}{\gamma \triangleright e_1 \star e_2 :: \text{int}} [i-\star]$$

$$\frac{\gamma \triangleright e_1 : \top \quad \gamma \triangleright e_2 : \top}{\gamma \triangleright e_1 == e_2 :: \text{bool}} [\text{t-eq}]$$

$$\frac{\gamma \triangleright e_1 : \text{int} \quad \gamma \triangleright e_2 : \text{int}}{\gamma \triangleright e_1 > e_2 :: \text{bool}} [\text{t-gt}]$$

The typing of abstraction and application can be classically handled through the following equations. (Note also that the meta symbol $\to$ in [a] ranges over symbols $\to$ and $\twoheadrightarrow$.)

$$\frac{x \notin \text{dom}(\gamma) \quad \gamma, x:t_1 \triangleright e::t_2}{\gamma \triangleright \lambda x:t_1 \cdot e :: t_1 \to t_2} [f]$$

$$\frac{f, x \notin \text{dom}(\gamma) \quad \gamma, x:t_1, f:t_1 \twoheadrightarrow t_2 \triangleright e :: t_2}{\gamma \triangleright \text{fix } f(x:t_1) = e :: t_1 \twoheadrightarrow t_2} [\text{Fix}]$$

$$\frac{\gamma \triangleright e_1 :: t_1 \to t_2 \quad \gamma \triangleright e_2 : t_1}{\gamma \triangleright e_1(e_2) :: t_2} [a]$$

$$\frac{\gamma \triangleright e_1 :: t_1 \to t_2 \quad \gamma \triangleright e_2 : t_1}{\gamma \triangleright e_1(e_2) :: t_2} [a2]$$

The precise typing of some functional abstraction $A \triangleq \lambda x:\text{int}|\text{string}.x+x$ is not possible through this conventional approach, although it is correct from the execution point of view. This expression is defined herein as type int|string$\to$int|string since A(10) $\twoheadrightarrow$ 20 and A('10') $\twoheadrightarrow$ '1010'. In addition, the following is asserted as well A(10):int and A('10'):string. The following sets of equations provide more typing power both for non-recursive and recursive abstractions (where in the equation [Fix$^+$] $t_i \in \{t_1, \ldots, t_n\}$ and all distinct, and in the equation [a$^+$]$i_1, \ldots, i_k \in [1,n]$ and all distinct).

$$\frac{x \notin \mathrm{dom}(\gamma) \quad \gamma, x:t_1 \rhd e :: t'_1 \cdots \gamma, x:t_n \rhd e :: e'_N}{\gamma \rhd \lambda x:t_1|\cdots|t_n \cdot e :: (t_1 \to t'_1) \oplus \cdots \oplus (t_n \to t'_n) \oplus (t_1 \to t'_1|\cdots|t_n \to t'_n)} \quad [f^+]$$

$$\frac{f, x \notin \mathrm{dom}(\gamma) \quad \gamma, x:t_1, f:t_1 \twoheadrightarrow t'_1 \rhd e::t'_1 \ldots \gamma, x:t_n, f:t_n \twoheadrightarrow t'_n \rhd e::t'_n}{\gamma \rhd \mathrm{fix} f(x:t_1|\ldots|t_n) = e::t_1 \twoheadrightarrow t'_1 \oplus \cdots \oplus t_n \twoheadrightarrow t'_n \oplus t_1|\ldots|t_n \twoheadrightarrow t'_1|\ldots|t'_n} \quad [\mathrm{Fix}^+]$$

$$\frac{\gamma \rhd e_1 :: t_1 \to t'_1|\cdots|t_n \to t'_n \quad \begin{cases} \gamma \rhd e_2:t_{11} \cdots \gamma \rhd e_2:t_{1k} \quad t_{11} \leqslant \cdots \leqslant t_{1k} \\ \vdots \qquad\qquad \vdots \\ \gamma \rhd e_2:t_{j1} \cdots \gamma \rhd e_2:t_{jm} \quad t_{11} \leqslant \cdots \leqslant t_{1k} \end{cases}}{\gamma \rhd e_1(e_2) :: t'_{11} \oplus \cdots \oplus t'_{j1}} \quad [a^+]$$

$$\frac{\gamma \rhd e_1 :: t_1 \to t_2|\cdots|t_n \to t'_n \quad \gamma \rhd e_2:t_{i1} \cdots \gamma \rhd e_2:t_{ik}}{\gamma \rhd e_1(e_2) :: t'_{i1} \oplus \cdots \oplus t'_{ik}} \quad [a2^+]$$

D. The Composition of Functional Abstractions

The composition of abstractions specified in this section are performed through: an n-ary (parametric) operator that follows the syntax $\circledS_E(e_1, \ldots, e_n)$, where E is a lambda term that parameterizes the operation; and one unary operator $\circledS(e)$. The semantics of the first composition is defined by the following three rules [c0], [c1], and [c2]:

$$\frac{e_i \to e'_i}{\circledS_E(v_1, \ldots, e_i, \ldots, e_n) \to \circledS_E(v_1, \ldots, e'_i, \ldots, e_n)} \quad [c0]$$

Rule [c0] shows that each operand is normalized, following a left to right order. The next rule [c1] shows how the operator reduces to its terminal form when all operands are normalized to lambda abstractions as follows:

$$\text{(z fresh)} \frac{E(e_1[z/x_1])\cdots(e_n[z/x_n]) \twoheadrightarrow \circ e}{\circledS_E(\lambda x_1:t\cdot e_1, \ldots, \lambda x_n:t\cdot e_n) \to \lambda z:t\cdot e} \quad [c1]$$

The composition of (at least) one recursive lambda abstraction produces a recursive lambda abstraction reduced to its terminal form as follows in rule [c2]:

$$(F, z \text{ fresh}) \frac{E(e_1[z/x_1])\cdots(e_n[F/f_i, z/x_i])\cdots(e_n[z/x_n]) \twoheadrightarrow \circ e}{\circledS_E(\lambda x_1:t\cdot e_1, \ldots, \mathrm{fix}\, f_i(x_i:t) = e_i, \ldots, \lambda x_n:t\cdot e_n) \to \mathrm{fix}\, F(z:t) = e} \quad [c2]$$

The semantics of the second operator are defined by the following two rules [c3a] and [c3]:

$$\frac{e \to e'}{\mathbb{Y}(e) \to \mathbb{Y}(e')} \quad [c3a]$$

$$(f \text{ fresh}) \; \mathbb{Y}(\lambda x:t\cdot e) \to \mathrm{fix}\, f(x:t) = f(e) \quad [c3]$$

D.1 Typing of Composition Operators

The composition operators are typed as follows (note that in this and other typing sections the symbol "→" means returns, where in other sections not concerning typing, it means transforms):

$$i \in [1, n] \frac{\gamma \rhd E :: t'_1 \to \cdots \to t'_n \to t_2 \quad \gamma \rhd e_i : t_1 \to t'_i}{\gamma \rhd \circledS_E(e_1, \ldots, e_n) :: t_1 \to t_2} \quad [C-1]$$

For all i, j $\in[1,n]$, i≠j:

$$\frac{\gamma \rhd E :: t'_1 \to \cdots \to t'_n \to t_2 \quad \gamma \rhd e_i : t_1 \to t'_i \quad \gamma \rhd e_j : t_1 \twoheadrightarrow t'_j}{\gamma \rhd \circledS_E(e_1, \ldots, e_n) :: t_1 \twoheadrightarrow t_2} \quad [C-2]$$

$$\frac{\gamma \rhd e :: t_1 \to t_2}{\gamma \rhd \mathbb{Y}(e) :: t_1 \twoheadrightarrow t_2} \quad [F]$$

D.2 Computational Equivalence

This section defines an equivalence over terms of the calculus defined herein, noted "~", up to α-equivalence "=$^\alpha$" (i.e., two terms are α-equivalent if there exists a substitution which brings the terms to syntactic equality).

Definition 4: Computational Equivalence "~" is given by:

$$e_1 \sim e_2 \text{ iff } e_1 \twoheadrightarrow v_1 \text{ and } e_2 \twoheadrightarrow v_2 \text{ and } v_1 =^\alpha v_2$$

It may be shown that "~" is an equivalence relation, i.e., reflexive, symmetric and transitive (assuming that "=$^\alpha$" is an equivalence relation also).

D.3 Application to the Computation of Numeric Series

This section provides examples of the application of composition operators to the computation of numeric series. Consider the recursive function "Fact" which computes the factorial product of any positive integer "x" as follows:

Fact $\stackrel{\mathrm{def}}{=}$ fix $f(x:\mathrm{int})$=if $x$>1 then $x*f(x-1)$ else $x$ Applied to 4, "Fact" returns 4!=4×3×2×1 (i.e., Fact (4)$\twoheadrightarrow$∘24). In addition, consider the following functions "S" and "Fibo" (which computes the Fibonacci number of rank "x"):

S⌀fix $f(x:\mathrm{int})$=if $x$>1 then $x+f(x-1)$ else $x$

Fibo⌀fix $f(x:\mathrm{int})$=if $x$>1 then $f(x-2)+f(x-1)$ else $x$

Considering now the function "S" which applied to 4 returns 4+3+2+1 (i.e., S(4)$\twoheadrightarrow$∘10), it can be observed there exists a strong similarity between the structure of the code for the functions "Fact" and "S". In addition, a similar structure for the code can be observed between the functions "Fact" and "Fibo".

The composition operators defined herein are advantageously adapted to capture "patterns" in the example functions (e.g., Fact, S, and Fibo) as the composition of fewer fundamental lambda abstractions, some of which are reused several times in order to build the following ~-equivalent abstractions:

| Id | $\stackrel{\mathrm{def}}{=}$ | $\lambda x{:}\mathrm{int}.x$ |
|---|---|---|
| Add | $\stackrel{\mathrm{def}}{=}$ | $\lambda x{:}\mathrm{int}.\lambda y{:}\mathrm{int}.x + y$ |

-continued

| | | |
|---|---|---|
| Sub | _def_ | λx:int.λy:int.x − y |
| Mul | _def_ | λx:int.λy:int.x * y |
| If | _def_ | λx:int.λy:int.if x > 1 then y else x |

Proposition 1: Is given by:

| | | |
|---|---|---|
| let A _def_ ⊡$_{Sub}$(Id, λx:int.1) | then | A ~ λx:int.x − 1 |
| let B _def_ ⊡$_{Sub}$(Id, λx:int.2) | then | B ~ λx:int.x − 2 |

Proving proposition 1 is a straightforward application of [c1] on A and B (defined above) that result in a lambda term which cannot be further reduced and is an α-equivalent to "λx:int.x−1".

Proposition 2: Is given by:

⊡$_{If}$(Id,⊡$_{Mul}$(Id,⋈(A))) ~ Fact
⊡$_{If}$(Id,⊡$_{Add}$(Id,⋈(A))) ~ S
⊡$_{If}$(Id,⊡$_{Add}$(⋈(B),⋈(A))) ~ Fibo In proving proposition 2, a derivation path is produced for the function "Fact" as follows:

| | | |
|---|---|---|
| ⊡$_{If}$(Id,⊡$_{Mul}$(Id,⋈(A))) | $\xrightarrow{a}$ | ⊡$_{If}$(Id,⊡$_{Mul}$(Id,fixF(z:int)=F(z − 1))) |
| | $\xrightarrow{b}$ | ⊡$_{If}$(Id,fixF(z':int)=z' * F(z' − 1)) |
| | $\xrightarrow{c}$ | fixF'(z":int)=if z" > 1 then z" * F'(z" − 1) else z" | where a, b, and c correspond to:
$^a$c0.c0.c3
$^b$c0, c2, @$_2$, β$_1$, β$_1$
$^c$c2, @$_2$, β$_1$, β$_1$ Proposition 3 (which provides that during composition basic building blocks can be reused) is given by:

let Z _def_ λa:int → int → int.λb:int → int⊡$_{If}$(Id,⊡$_a$(b,⋈(A)))
then $\begin{cases} Z(Mul)(Id) \sim Fact \\ Z(Add)(Id) \sim S \\ Z(Add)(⋈(B)) \sim Fibo \end{cases}$ It will be appreciated that the obtained reuse is "syntactic", as opposed to the functional reuse which is related to runtime factorization of program instructions. As a consequence, the result of the composition will execute as fast as the original abstraction (e.g., Fact). However, standard functional composition will not benefit from similar efficiencies, with patterns such as:

fix $f(x:\text{int})$=if $x$>1 then $Mul(x)(f(Sub(x)(1)))$ else $x$ or with more abstract patterns such as:

$W \stackrel{def}{=} \lambda f:\text{int}\to\text{int}\to\text{int}.\lambda g:\text{int}\to\text{int}\to\text{int}.\text{fix}F(x:\text{int})=\text{if } x>1 \text{ then } f(x)(F(g(x)(1))) \text{ else } x$ which allows equivalent computation after installation of:
W(Mul)(Sub)(4)~Fact(4) and W(Add)(Sub)(4)~S(4)

In terms of computation costs, if W(Mul)(Sub)$\twoheadrightarrow^\circ$w and Z(Mul)(Id)$\twoheadrightarrow^\circ$z then w(n) computes n! through "8×(n−1)+1" steps versus "4×(n−1)+1" for z(n).

D.4 Handling Subtype Polymorphism (Generalization)

The definitions above for [c1] and [c2] require all parameters of functional abstractions to share the same type. This, however, is a little too restrictive. It would therefore be better for instance to use the definition "I$\stackrel{def}{=}$λx:T.x" rather than the earlier definition "λx:int.x", since the first definition is a more general identity function. However, correct typing for the composition needs to be ensured. For example, the expression:

$$⊡_{Mul}(I,\lambda x:\text{int}.x-1)$$

cannot be typed (i.e., Mul:int→int→int does not yield T≺int). Accordingly, the following polymorphic variants for [c1], [c2], [C-1], [C-2] (i∈[1,n], $t^\times=t_1 \otimes \ldots \otimes t_n$ and $t^+= t_1 \oplus \ldots \oplus t_n$) are given by:

$$(z \text{ fresh}) \frac{E(e_1[z/x_1])\cdots(e_n[z/x_n]) \twoheadrightarrow \circ e}{⊡_E^\oplus(\lambda x_1:t_1 \cdot e_1, \ldots, \lambda x_n:t_n \cdot e_n) \to \lambda z:t^\times \cdot e} \quad [c1]$$

$$(F, z \text{ fresh}) \frac{(E(e_1[z/x_1])\cdots(e_i[F/f_i, z/x_i])\cdots(e_n[z/x_n]) \twoheadrightarrow \circ e)}{(⊡_E^\oplus(\lambda x_1:t_1 \cdot e_1, \ldots, \text{fix } f_i(x_i:t_i) = e_i, \ldots, \lambda x_n:t_n \cdot e_n) \to \text{fix } F(z:t^\times) = e)} \quad [c2]$$

$$\frac{\gamma \triangleright E :: t'_1 \to \cdots \to t'_n \to t_2 \quad \gamma \triangleright e_i : t^\times \to t_2}{\gamma(\triangleright \Box)_E^\oplus(e_1, \ldots, e_n) :: t^\times \to t_2} \quad [\text{C-1a}]$$

$$\frac{\gamma \triangleright E :: t'_1 \to \cdots \to t'_n \to t_2 \quad e_i \stackrel{*}{\to} \lambda x:t \cdot e'_i \oslash, e:t^\oplus \triangleright e'_i:t'_i}{\gamma(\triangleright \Box)_E^\oplus(e_1, \ldots, e_n) :: t^\oplus \to t_2} \quad [\text{C-1b}]$$

$$\gamma \triangleright E :: t'_1 \to \cdots \to t'_n \to t_2$$
$$e_i \stackrel{*}{\to} \lambda x:t \cdot e'_i \oslash, e:t^\times \triangleright e'_i:t'_i$$
$$j \in [1, n], j \neq i \frac{e_j \stackrel{*}{\to} \text{fix } f(x:t) = e'_j \oslash, x:t^\times, f:t^\times \twoheadrightarrow t'_j \triangleright e'_j:t'_j}{\gamma(\triangleright \Box)_E^\oplus(e_1, \ldots, e_n) :: t^\times \twoheadrightarrow t_2} \quad [\text{C-2a}]$$

E. Extending the Calculus with Imperative Expressions

E.1 Computing Environment

The computing environment, which is noted herein as S, is a stack of mappings from names (of variables) to reduced values, such that:

$$S::=\{x_i^v\} | S, \{x_i^v\}$$

with $x_i^v$ defining a notation for the mapping of a unique label $x_i$ into a reduced value $v_i$, and where "$^S,x^v$" is often an abbreviation for "$^S,s \cup \{x^v\}$".

The transition relation now becomes S⊢e→S'⊢e' in the general case, although invariant execution structures can be skipped for clarity when required. Informally, this relation means "expression e computed in environment S becomes e' in environment S'", while understanding that S' is possibly different from S. In this new environment, previous computation e→e' must be understood as ∅⊢e→∅⊢e', and previous rules comprising relations like e→e' must be understood as S⊢e→S'⊢e'.

E.2 Syntactic Extensions

Syntactic extensions mainly introduce variable declarations, imperative control statements and procedural abstractions. Two distinguished values unit, none together with their associated types Unit, None play an important role in defining (and typing) procedural composition. Note also that the ∇-abstraction (also called "pam" for "polymorphic abstract machine") and its recursive variant have distinct types (similar to λ-abstractions).

```
e ::= var x = e.e |                variable declaration
      x := e | * (e) | e;e |       eassignment, iteration, sequencing
      e ⇒e | [|e₁,...,eₙ|]         rule, action systems
      unit | none | pop x |        special constants, internal op
      ∇x:t,y:t.e |                 ∇ procedural abstraction
      fixF(x:t,y:t)=e              ∇ fix point abstraction
t ::= Unit | None | t ⇒t | t ⇒t    Unit and None type, pam,
                                   recursive pam
```

Note that "pop x" is intended to be an internal term used for defining the semantics of nabla application (as generated by the interpreter) (see [@-∇, @-∇-F]), not explicitly available for specifying computation.

E.3 Operational Semantics

The following equations describe the semantics of variable access ([var]), pop operation ([pop]), and declarations ([d1], [d2]):

$$S, x^v \vdash x \to S, x^v \vdash v \quad [var]$$

$$S, s \cup \{x^v\} \vdash pop\ x \to S \vdash v \quad [pop]$$

$$\frac{S \vdash e_1 \to S' \vdash e_1'}{S \vdash var x = e_1 \cdot e_2 \to S' \vdash \to var x = e_1' \cdot e_2} [d1]$$

$$S, s \vdash var\ x = v.e \to S, s \cup \{x^v\} \vdash e \quad [d2]$$

Assignment allows changing the value referenced by a variable as follows:

$$\frac{S \vdash e \to S' \vdash e'}{S \vdash x := e \to S' \vdash x := e'} [v - assg]$$

$$S, x^{v, x := v \to S, x v} \vdash unit \quad [v\text{-}assg]$$

Iteration of a statement relies on a Boolean invariant: the statement evaluates to a unit. A rule which cannot be applied evaluates to none.

$$*(e) \to if\ e == unit\ then\ *(e)\ else\ unit \quad [iter]$$

$$e_1 \Rightarrow e_2 \to if\ e_1 == true\ then\ e_2\ else\ none \quad [rule]$$

An action system is an ordered collection of statements. Statement i+1 is executed only if statement "i" evaluates to none.

$$v_f\ fresh, n \geq 2\ \ [|e_1, \ldots, e_n|] \to \begin{bmatrix} var\ v_f = e_1. \\ if\ (v_f = none) \\ then\ [|e_2, \ldots, e_n|] \\ else\ v_f \end{bmatrix} [AsysI]$$

$$[|e|] \to e \quad [Asys2]$$

A sequence of statement evaluates first its left argument.

$$\frac{S \vdash e_1 \to S' \vdash e_1'}{S \vdash e_1; e_2 \to S' \vdash e_1'; e_2} [seq1]$$

$$v; e_2 \to e_2 \quad [seq2]$$

Application on procedural abstractions creates a new store on top of the stack of mappings in the computing environment S. This store contains the input value and the output is initialized through a default value computed by init (t) from the type "t". The result (i.e., the value of the output parameter after completion of the computation) is returned through the following pop instruction:

$$t_2 \neq \bot S \vdash \nabla x:t_1,y:t_2.e(v) \to S, \{x^v, y^{init(t2)}\} \vdash e;\ pop\ y \quad [@\text{-}\nabla]$$

The application on recursive procedural abstractions "f" similarly creates a new store on top of the stack that contains a reference to "f" itself as follows:

$$t_2 \neq \bot S \vdash fix f(x:t_1,y:t_2) = e(v) \to S, \{f^{fix\ f(x:t1,y:t2)=e}, x^v, y^{init(t2)}\} \vdash e;\ pop\ y \quad [@\text{-}\nabla\text{-}F]$$

E.4 Type System

Additions to the type system set forth in section C include the following equations:

$$\gamma \triangleright unit :: Unit \quad [Unit]$$

$$\gamma \triangleright none :: None \quad [None]$$

$$\frac{\gamma \triangleright x :: t}{\gamma \triangleright pop x :: t} [Pop]$$

$$x \notin dom(\gamma)$$

$$\frac{\gamma \triangleright e_1 : t\ \gamma, \bar{x}:t \triangleright e_2 :: t'}{\gamma \triangleright var\ x = e_1 \cdot e_2 :: t'} [Dec1]$$

$$\frac{\gamma \triangleright e:t}{\gamma, \bar{x}:t \triangleright x := e :: Unit} [Assg]$$

$$\frac{\gamma \triangleright e :: Unit|None}{\gamma \triangleright *(e) :: Unit} [Iter]$$

$$\frac{\gamma \triangleright e_1 : Unit|None\ \gamma \triangleright e_2 :: t_2}{\gamma \triangleright e_1; e_2 :: t_2} [Seq]$$

As set forth in the equation [Dec1] above, a variable name "x" is introduced into the environment with the notation "$\bar{x}$". This is required in order to distinguish variable names from lambda parameters. With a parameter such as "y", an operation such as "y:=e" is not well typed since the equation [Assg] requires a variable name. In the declaration [T-∇, T-∇-F], input and output parameters are introduced as variables into the environment so that they can be modified when embedded code is executed.

In the following two equations, "α" makes explicit the type of the code embedded into the abstraction. This is not used in the subtype relation (see [∇-sub1, ∇-sub2]), but in the composition operations defined later.

$$t_2 \neq \bot \ \frac{x, y \notin dom(\gamma)\ \gamma, \bar{x}:t_1,\ \bar{y}:t_2 \triangleright e :: \alpha\ \gamma \triangleright \alpha \preceq Unit|None}{\gamma \triangleright \nabla x:t_1 y:t_2.e :: t_1 \stackrel{\alpha}{\Rightarrow} t_2} [T\text{-}\nabla]$$

$$t_2 \neq \bot \ \frac{x, y, f \notin dom(\gamma)\ \gamma, \bar{f}:t_1|\stackrel{\alpha}{\Rightarrow}t_2\ \bar{x}:t_1, \bar{y}:t_2 \triangleright e :: \alpha\ \gamma \triangleright \alpha \preceq Unit|None}{\gamma \triangleright fix f(x:t_1, y:t_2) = e :: t_1|\stackrel{\alpha}{\Rightarrow} t_2} [T\text{-}\nabla\text{-}F]$$

$$\frac{\gamma \triangleright t_2 \preceq t_4\ \gamma \triangleright t_3 \preceq t_1}{\gamma \triangleright t_1 \stackrel{\alpha}{\Rightarrow} t_2 \preceq t_3 \stackrel{\alpha'}{\Rightarrow} t_4} [\nabla\text{-}sub1]$$

-continued $$\frac{\gamma \triangleright t_2 \preccurlyeq t_4 \quad \gamma \triangleright t_3 \preccurlyeq t_1}{\gamma \triangleright t_1 \stackrel{\alpha}{\Rightarrow} t_2 \preccurlyeq t_3 \stackrel{\alpha'}{\Rightarrow} t_4}[\nabla\text{-sub2}]$$

$$\frac{\gamma \triangleright e_1 : bool \quad \gamma \triangleright e_2 :: t}{\gamma \triangleright e_1 \Rightarrow e_2 :: t \oplus \text{None}}[\text{Rule}]$$

$$\frac{\gamma \triangleright e_1 :: t_1 \oplus \text{None} \quad \cdots \quad \gamma \triangleright e_{n-1} :: t_{n-1} \oplus \text{None} \quad \gamma \triangleright e_n :: t_n}{\gamma \triangleright [\![e_1, \ldots, e_n]\!] :: t_1 \oplus \ldots \oplus t_n}[\text{Asys}]$$

F. Polymorphic Composition of ∇-Abstractions

In this section, the meta-variables $*$, $\Diamond$ range over $\{\oplus, \otimes\}$. A parametric function $\Phi$ performs a syntactic transformation of "n" terms into a new term.

F.1 Semantics

Defining the composition operator:

$$\frac{\Phi_E(e_1[x/x_1, y/y_1], \cdots, e_n[x/x_n, y/y_n]) \twoheadrightarrow \circ e}{\boxed{\phantom{x}}_E^{*,\circ}(\nabla x_1{:}t_1, y_1{:}t_1' \cdot e_1, \cdots, \nabla x_n{:}t_n, y_n{:}t_n' \cdot e_n) \rightarrow \nabla x{:}t_1 \star \cdots \star t_n, y{:}t_1' \Diamond \cdots \Diamond t_n' \cdot e}[c4]$$

More precisely, $\Phi_E$ kinitially performs a recursive decent while it encounters variable declarations (the last variable declarations are not ignored but consistently renamed in order to avoid name clashes) and then applies "E" to the first term found. The $\Phi$ function over terms is formally defined by ($\bar{e}$ is a notation for any term "e" which does not have the syntactic form var x=e$_1$.e$_2$):

$\Phi_E(\text{var } x_1 = e_1.e_1', \ldots, e_n) = \text{var } x_f = e_1.\Phi_E(e_1'[x_f/x_1], \ldots e_n) \ (x_f \text{ fresh})$ $\Phi_E(\bar{e}_1, \ldots, e_n) = E(\bar{e}_1, \Phi_E(e_2, \ldots, e_n))$ $$\frac{\Phi_E(e_1[x/x_1, y/y_1], \cdots, e_i[F/f_i, x/x_i, y/y_i], \cdots, e_n[x/x_n, y/y_n]) \twoheadrightarrow \circ e}{\boxed{\phantom{x}}_E^{*,\circ}(\nabla x_1{:}t_1, y_1{:}t_1' \cdot e_1, \cdots, \text{fix } f_i(x_i{:}t_i, y_i{:}t_i) = e_i, \cdots, \nabla x_n{:}t_n, y_n{:}t_n' \cdot e_n) \rightarrow \text{fix } F(x{:}t^\star, y{:}t'^\circ) = e}[c5]$$

$$t_1' \star t_2 \neq \bot \frac{\Phi_E(e_1[x/y_1], e_2[x/x_2]) \twoheadrightarrow \circ e}{\boxed{\phantom{x}}_E^\star(\nabla x_1{:}t_1, y_1{:}t_1' \cdot e_1, \nabla x_2{:}t_2, y_2{:}t_2' \cdot e_2) \rightarrow \nabla x_1{:}t_1, y_2{:}t_2' \cdot \text{var} x = \text{init}(t_1' \star t_2) \cdot e}[c6]$$

and with:

Iter $\stackrel{def}{=}$ $\lambda$x:Unit|None.*(x)

$$\frac{\Phi_{Iter}(e) \twoheadrightarrow \circ e'}{\boxed{\phantom{x}}(\nabla x{:}t, y{:}t' \cdot e) \rightarrow \nabla x{:}t, y{:}t' \cdot e'}[c7]$$

$$\frac{\Phi_{Iter}(e) \twoheadrightarrow \circ e'}{\boxed{\phantom{x}}(\text{fix } f(x{:}t, y{:}t') = e) \rightarrow \text{fix } f(x{:}t, y{:}t') = e'}[c8]$$

$$\boxed{\phantom{x}}(\nabla x{:}t, y{:}t' \cdot e) \rightarrow \nabla y{:}t', x{:}t \cdot e[c9]$$

$$\boxed{\phantom{x}}(\text{fix } f(x{:}t, y{:}t') = e) \rightarrow \text{fix } f(y{:}t', x{:}t) = e[c10]$$

F.2 Typing

In accordance with the meta symbols:

$*, \Diamond, \epsilon \{\oplus, \otimes\}; i, j \epsilon [1,n], i \neq j$, and $t^* = t_1^* \ldots *t_n, t' \Diamond = t'_1 \Diamond \ldots \Diamond t'_n$ $$\gamma \triangleright E :: \alpha_1 \rightarrow \cdots \rightarrow \alpha_n \rightarrow \alpha$$

$$t'^\circ \neq \bot \frac{e_i \stackrel{*}{\rightarrow} \nabla x{:}t_i, y{:}t_i' \cdot e_i' \quad \gamma, \bar{x}{:}t^\star, \bar{y}{:}t'^\circ \triangleright e_i' :: \alpha_i}{\gamma \triangleright \boxed{\phantom{x}}_E^{*,\circ}(e_1, \cdots, e_n) :: t^\star \stackrel{\alpha}{\Longrightarrow} t'^\circ}[C-\nabla]$$

$$\gamma \triangleright E :: \alpha_1 \rightarrow \cdots \rightarrow \alpha_n \rightarrow \alpha$$

$$e_i \stackrel{*}{\rightarrow} \nabla x{:}t_i, y{:}t_i' \cdot e_i' \quad \gamma, \bar{x}{:}t^\star, \bar{y}{:}t'^\circ \triangleright e_i' :: \alpha_i$$

$$e_j \stackrel{*}{\rightarrow} \text{fix } f_j(x{:}t_j, y{:}t_j') = e_j' \quad \gamma, \bar{x}{:}t^\star,$$

$$t'^\circ \neq \bot \frac{\bar{y}{:}t'^\circ, \bar{f}_j{:}t^\star \underset{\approx}{\otimes} t'^\circ \triangleright e_j' :: \alpha_j}{\gamma \triangleright \boxed{\phantom{x}}_E^{*,\circ}(e_1, \cdots, e_n) :: t^\star \underset{\approx}{\otimes} t'^\circ}[C-\nabla-F]$$

$$\gamma \triangleright E :: \alpha_1 \rightarrow \alpha_2 \rightarrow \alpha$$

$$e_1 \stackrel{*}{\rightarrow} \nabla x_1{:}t_1, y_1{:}t_1' \cdot e_1'$$

$$\gamma, \bar{x}_1{:}t_1, \bar{y}_1{:}t_1' \star t_2 \triangleright e_1' :: \alpha_1$$

$$e_2 \stackrel{*}{\rightarrow} \nabla x_2{:}t_2, y_2{:}t_2' \cdot e_2'$$

$$t'^\circ \neq \bot \frac{\gamma, \bar{x}_2{:}t_1, \star t_2, \bar{y}_2{:}t_2 \triangleright e_2' :: \alpha_2}{(\gamma \triangleright \boxed{\phantom{x}}_E^\star(e_1, e_2) :: t_1 \stackrel{\alpha}{\Longrightarrow} t_2')}[\text{Pipe}]$$

$$\frac{\gamma \triangleright e :: t \stackrel{\text{Unit|None}}{\Longrightarrow} t'}{\gamma \triangleright \boxed{\phantom{x}}(e) :: t \stackrel{\text{Unit}}{\Longrightarrow} t'}[\text{Iter}]$$

$$\frac{\gamma \triangleright e :: t \stackrel{\text{Unit|None}}{\Rightarrow} t'}{\gamma \triangleright \boxed{\phantom{x}}(e) :: t \stackrel{\text{Unit}}{\Rightarrow} t'}[\text{Iter}-\text{F}]$$

$$t' \neq \bot \frac{\gamma \triangleright e :: t' \stackrel{\alpha}{\Longrightarrow} t}{\gamma \triangleright \boxed{\phantom{x}}(e) :: t \stackrel{\alpha}{\Longrightarrow} t'}[\text{Swap}]$$

$$\frac{\gamma \triangleright e :: t' \underset{\approx}{\otimes} t \quad t = t'}{\gamma \triangleright \boxed{\phantom{x}}(e) :: t \underset{\approx}{\otimes} t'}[\text{Swap}-\text{F}]$$

G. A Set of Composition Operators

The following table defines different combinations of composition operators. It will be appreciated that while this set has particular efficiencies, other combinations are equally possible. Note that the concurrent execution operator "|" defined in the table below is disclosed in U.S. patent application Ser. No. 10/046,191, entitled "Bi-Valuation Of Programming Statements", which is incorporated herein by reference. In the table, the column with the heading "definition of E" defines the composition pattern of the composition operator defined in the column with the heading "operator".

| Circus syntax | E | definition of E(U N = Unit\|None) | operator |
|---|---|---|---|
| $e_1$ Then $e_2$ | Then | $\lambda$x:U N.$\lambda$y:U N.if x == unit then y else none | $\boxed{\phantom{x}}^{\oplus,\otimes}_{Then}(e_1, e_2)$ |
| $e_1$ Else $e_2$ | Else | $\lambda$x:U N.$\lambda$y:U N.if x == none then y else unit | $\boxed{\phantom{x}}^{\oplus,\otimes}_{Else}(e_1, e_2)$ |

-continued

| Circus syntax | E | definition of E(U N = Unit\|None) | operator |
|---|---|---|---|
| $e_1$ Before $e_2$ | Before | λx:U N.λy:U N.x;y | $\boxdot_{Before}^{\oplus,\otimes}(e_1, e_2)$ |
| $e_1$ During$^a$ $e_2$ | During | λx:U N.λy:U N.x\|\|y | $\boxdot_{During}^{\oplus,\otimes}(e_1, e_2)$ |
| If $e_1$ Then $e_2$ Else $e_3$ | Test | λx:U N.λy:U N. λz:U N.if x == unit then y else z | $\boxdot_{Test}^{\oplus,\otimes}(e_1, e_2, e_3)$ |
| $e_1$ PThen $e_2$ | Then | λx:U N.λy:U N.if x == unit then y else none | $\boxdot_{Then}^{\oplus,\otimes}(e_1, e_2)$ |
| $e_1$ PElse $e_2$ | Else | λx:U N.λy:U N.if x == none then y else unit | $\boxdot_{Else}^{\oplus,\otimes}(e_1, e_2)$ |
| $e_1$ PBefore $e_2$ | Before | λx:U N.λy:U N.x;y | $\boxdot_{Before}^{\oplus,\otimes}(e_1, e_2)$ |
| *(e) | n. a. | n. a. | ⊠(e) |

Note that the second section of the table above defines operations which are polymorphic with respect to the application. For instance, if $e:t_1 \mapsto t_2$ and $e':t'_1 \mapsto t_2$ then, the composition (assuming it is well typed) e PBefore e' has a type $t_1 \oplus t'_1 \mapsto t_2 \otimes t'_2$ which is a subtype of both original types by property of $\oplus$ and $\otimes$:

$$\frac{t_2 \otimes t'_2 \preceq t_2 \quad t_1 \preceq t_1 \oplus t'_1}{t_1 \oplus t'_1 \mapsto t_2 \otimes t'_2 \preceq t_1 \mapsto t_2} [\nabla-\text{sub}2]$$

$$\frac{t_2 \otimes t'_2 \preceq t'_2 \quad t'_1 \preceq t_1 \oplus t'_1}{t_1 \oplus t'_1 \mapsto t_2 \otimes t'_2 \preceq t'_1 \mapsto t'_2} [\nabla-\text{sub}2]$$

This is an interesting property from the polymorphic reuse point of view. In particular, this property is required for the composition of recursive parameters since it guarantees the re-entrance of the fix point (from the type checking point of view).

The following table sets forth typing rules (i.e., type combination relations) of formal parameters for composition operators and functional abstractions, in which the meta symbols are given as: $*, \diamond \in \{\oplus, \otimes\}$.

| operand | $\boxdot^*_E$ | | ⊠ | |
|---|---|---|---|---|
| prefixes | example | arity | result | arity | result |
| λ | λx:t.e | n | lambda | 1 | λ-fix |
| λ-fix | fixf(x:t) = e | n | λ-fix | — | — |
| mixed | | n | λ-fix | — | — |

The following table sets forth typing rules (i.e., type combination relations) of formal parameters for composition operators and procedural abstractions, in which the meta symbols are given as: $*, \diamond \in \{\oplus, \otimes\}$.

| operand | $\boxdot^{*,\diamond}_E$ | | ⊠ | | ⊗ | | $\square_E$ | |
|---|---|---|---|---|---|---|---|---|
| prefixes | examples | arity | result | arity | result | arity | result | arity | result |
| ∇ | ∇x:$t_1$,y:$t_2$.e | n | ∇ | 1 | ∇ | 1 | ∇ | 2 | ∇ |
| ∇-fix point | fixf(x:$t_1$,y:$t_2$)=e | n | ∇-fix | 1 | ∇-fix | 1 | ∇-fix | — | — |
| mixed | — | n | ∇-fix | — | — | — | — | — | — |

H. Safety Properties of the Calculus

This section first proves a general type preservation property for the core calculus C. Then this section sets forth a strong type soundness on a restricted functional calculus F (called the core calculus: without fix point construction). Subsequently this section sets forth a weak soundness on C/F(E), a subset of C obtained by restricting composition patterns E to F.

H.1 General Type Preservation Property

Definition 5: Soundness of an execution environment S with respect to a typing environment γ, (written ⊢S:γ) is given by:

⊢S:γ iff ∀x$^v$∈S, γ▷x::t and γ▷v::t

Theorem 1: Type preservation (subject reduction):

for all e,γ,S, such that γ▷e::t and ⊢S:γ then S ⊢e→S'⊢e' implies γ▷e'::t and ⊢S':γ

Proof: Uses a structural induction. All typing cases for progressing terms are considered.

H.2 Strong Type Soundness of the Core Calculus

Lemma 1: Reduction steps decrease the complexity of terms. (Given a relevant complexity measure of terms,

|.|:F→Nat, then if e→e', then |e'|<|e|).

Proof: As no fix point constructions are allowed, it can be shown that each computation step reduces the complexity of the term (this uses an inductive structural complexity measurement function such that |e|>0 (e is not a value and |v|=0).

Theorem 2: Progression of well typed terms e of F. (if ∅▷e:t then if e is not a value, e→e').

Proof: Uses a structural induction. All typing cases are considered.

Theorem 3: Strong type soundness for F. (For all term ∅▷e, if e:t then e$^\boxtimes$v)

Proof: If e is a value, then the proof is obvious. Otherwise, the progress theorem 2 insure that e will evolve, and the type preservation theorem says that it preserves the type. Lemma 1 says that each intermediate term has a complexity that decreases down to zero (value).

H.3 Weak Type Soundness of the Whole Calculus C/F(E)

The calculus C/F(E) is weakly sound, which means that for a given term e that is well typed in a given environment, if the computation of e in a valid execution environment terminates, then the result is necessarily a value.

Theorem 4: Progression of well typed terms:

for all e,γ,S such that γ▷e:t, ⊢S:γ then if e is not a value, necessarily S⊢e→S'⊢e'

Proof: In this proof the technical difficulty relies in the computation of composition operators, since the numerators of [c1] and [c2] must be themselves terminating computations. This means that the transition c1, c2 might never occur (i.e., it may be stuck in a state) if the computation is endless.

But as E is a term of F, then the strong soundness theorem 3 guarantees the termination, thus the transitions c1 and c2.

Corollary 1: Well typed closed normal terms are values: if $\gamma \triangleright e:t, \vdash S:\gamma$ and $S \vdash e \not\rightarrow$, then e is a value.

Proof: It is made by showing logical equivalence of the progress theorem 4. This last theorem 4 can be written under the propositional form $a \perp b \Rightarrow c$ and our corollary as $a \perp \neg c \Rightarrow \neg b$, where a is "$\emptyset \triangleright e:t$", b is "e is not a value" and c is "$e \rightarrow e'$". By rewriting the implications, the first form is equivalent to $\neg \neg c$) and the second to $\neg(a \perp \neg c \perp \neg \neg c)$. This is easily amenable to $\neg(a \perp b \perp \neg c)$.

Theorem 5: Weak type soundness of C/F(E):

For all $e, \gamma, S$, if $\gamma \triangleright e:t$, $\vdash S:\gamma$ and $S \vdash e \rightarrow S' \vdash e' \not\rightarrow$, then e' is a value Proof: By induction on the length "i" of the derivation path $e \rightarrow e'_{\not\rightarrow}$ and by considering two cases: e is a value (is an obvious proof), and e is not a value. In the case e is not a value, the progress theorem 4 says that there is a transition step, and the subject reduction (theorem 1) says that the derived term is well typed. This reasoning can be iterated until the final form is reached. At this point, the corollary 1 raises the expected result.

I. Polymorphic Composition of Records

This section illustrates the benefits of composing record data structures and associated types. Records are well known as a powerful modeling tool.

I.1 Definition

The following definitions illustrate how to build record terms and how to access a record having a name "m".

Definition 6: Syntax Of Expression "e" And Type "t"

| | |
|---|---|
| e ::= $<m_1=e_1,...,m_n=e_n>$ | a record term, with $m_i$ as member names |
| ::= e.m | acces to the content of member "m" |
| t ::= $<m_1:t_1,...,m_n:t_n>$ | record types |

Records can be understood as composite data structures in which sub-elements are stored under a labeled identifier. This offers order insensitive, easy to memorize ways of handling structured information, both from the storage and access point of view. For example defining:

Person $\stackrel{def}{=}$ <name: string, firstname: string> allows the modeling of a person such as (note the order is not of importance in this instance):

Jo $\stackrel{def}{=}$ <firstname: 'John', name: 'Doe'>

In addition, as is known in the art, subtype relations may be defined on record data types. The following record type illustrates an example of a subtype relation while remaining consistent when reading and writing to access members:

AwardWinner $\stackrel{def}{=}$ < name: string, firstname: string, prize: string >

This record type continues to allow modeling of person and member access:

P1 $\stackrel{def}{=}$ $\nabla$p: Person, s: string .(s := p. firstname + "" + p. name)

with for example Jo, Do, and Ro:

Do $\stackrel{def}{=}$ < name = "Knuth", firstname = "Donald", prize = "Alan Turing Award" >

Ro $\stackrel{ref}{=}$ < firstname = "Robin", name = "Milner", prize = "Alan Turing Award" >

Definition 7: Record Typing $$\frac{\gamma \triangleright e_1 :: t_1 \ldots \gamma \triangleright e_n :: t_n}{\gamma \triangleright <m_1 = e_1, \ldots, m_n = e_n> :: <m_1:t_1, \ldots, m_n:t_n>} \text{[Rec]}$$

Definition 8: Record Subtyping:

$$\frac{\forall m_i \exists m'_j = m_i \mid \gamma \triangleright t_i \preccurlyeq t'_j}{\gamma \triangleright <m_1:t_1, \ldots, m_n:t_n> \preccurlyeq <m'_1:t'_1, \ldots, m'_k:t_k>} \text{[S-Rec]}$$

Note that $\text{dom}(<m_1:t_1, \ldots, m_n:t_n>) = \{m_1, \ldots, m_n\}$

Property 1: Intersection of record types:

$$\forall R, R' \quad \begin{cases} R = <m_1:t_1, \ldots, m_n:t_n> \\ R' = <m_1:t_1, \ldots, m_k:t_k> \end{cases}$$

then $$R \otimes R' = <m_i:t_i \otimes t'_i, m_l:t_l, m_p:t'_p>$$

with all $m_i$, $m_l$, $m_p$ such that $m_i \in \text{dom}(R) \cap \text{dom}(R')$, $m_l \in \text{dom}(R) \backslash \text{dom}(R')$, $m_p \in \text{dom}(R') \backslash \text{dom}(R)$ Proof: Performed by application of [S-Rec].

I.2 Using Record Polymophism in Pam Composition

Let PrizeWinner be: <name: string, year: int, prize: string> then the Property 1 in Section I.1 provides that Person $\otimes$ PrizeWinner is:

<firstname: string, name: string, year: int, prize: string> which is a record type that models information found in both initial records. This is particularly useful because composition using the $\otimes$ operator permits extension of the signature thereby enriching the computational environment. Defined below is a pam $P_2$ that computes a string representation of prize winner:

$\nabla$w: PrizeWinner, s:string.s:=s+w.name+"won the"+ w.prize+"prize in"+w.year Now $P_2$(<name="Milner", year="1991", prize="Alan Turing Award")

will return: "Milner won the Alan Turing Award prize in 1991."

with the following composition:

P $\stackrel{def}{=}$ $\nabla$x:T,y:string.(y:=y+":")

$P_3$ $\stackrel{def}{=}$ $P_1$ Before P Before $P_2$

Note also the type $P_3$ is defined as:

$\emptyset \triangleright P_3$::Person$\otimes$PriceWinner$\stackrel{Unit}{\Rightarrow}$string

EXAMPLE 1

$P_3$(<name="Milner", year="1991, firstname="Robin", prize="Alan Turing Award"> will return: "Robin Milner: Milner won the Alan Turing Award prize in 1991".

As shown in this example, both $P_1$ and $P_2$ operate with different record types while their composition operates with a mixture of both records. In addition, the example is formally well typed. For instance, proposing an integer value for year (e.g., the integer 1991 instead of the string "1991") would prevent finding a type for this example.

J. Illustration of a Modeling Tree Transformer

This section uses pattern matching expressions described in U.S. patent application Ser. No. 10/046,314, entitled "Symmetrical Structural Pattern Matching", which is incorporated herein by reference. For example, the syntactic notation $e_1\#f \oplus e_2$ evaluates to expression $e_2$ if the result of expression $e_1$ matches against the filter f; otherwise, the rule evaluates to the distinguished value none.

Filters can be recursively constructed and thus can reach arbitrary complexity levels. For example, some basic filters are "%e" (which matches any value equal to the result of e) and "? x" (which matches any value and stores the resulting value into x). A record filter is noted $<m_1=f_1, \ldots, m_n=f_n>$ where $f_i$ are filters, and matches against any record value $<m_1=v_1, \ldots, m_n=v_n>$ if every $v_i$ matches $f_i$.

Figure 5:
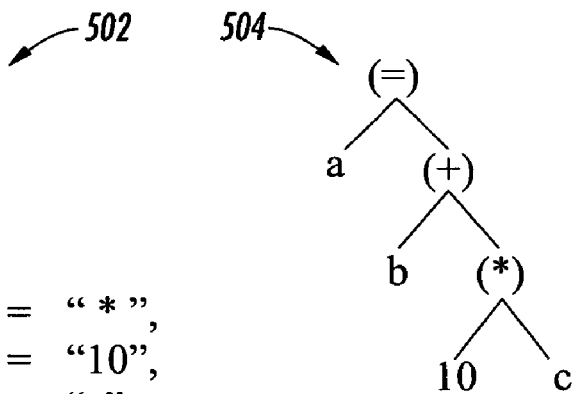
FIG. 5 illustrates a binary tree syntactically and illustratively for encoding the arithmetic expression "a=b+10*c"

The following recursive definition (where recursive types are assumed hereafter in this example to be handled by the type system) models binary trees where nodes are labeled by any type of value (T), and where leaves of the binary tree are strings:

$$\beta(<label:T, left:\beta, right:\beta>|string)$$

where such types allow for instance the modeling of syntactic trees that are found in programming languages. For example as shown in FIG. 5, the arithmetic expression "a=b+10* c" can be encoded as a binary tree syntactically at 502 and illustratively at 504.

The following abstraction of a "top-down recursive tree visitor" does not perform any transformation but instead visits all nodes and reconstructs an identical tree:

```
V = fixV(x:β,y:β)=[|
     x # <label=?lab, left=?l, right=?r>⇒
     y :=<label=lab, left=V(l), right=V(r)>,
     y := x
    |]
```

The following transformer A changes "+" labels in a binary tree into the numeric code ADD:

$t_1$=fix $T_1(x:\beta,y:\beta)=(x\#<label=\%$ "+", left=?l, right=?r>$\oplus y$:=<label=Add, left=$T_1(l)$, right=$T_1(r)$>)

A=$t_1$ else V

Figure 6:
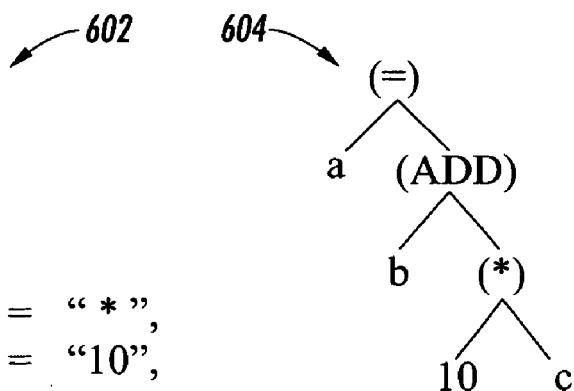
FIGS. 6 and 7 illustrate resulting binary trees syntactically and illustratively when two different transformers are applied to the binary tree shown in FIG. 5.

FIG. 6 illustrates the resulting binary tree syntactically at 602 and illustratively at 604 when the transformer A is applied to the binary tree shown in FIG. 5.

The following transformer B changes "*" labels into the numeric code MUL:

$t_2$=fix$T_2(x:\beta,y:\beta)=(x\#<label=\%$ "*", left=?l, right=?r> $\oplus y$:=<label=MUL, left=$T_2(l)$, right=$T_2(r)$>)

B=$t_2$ else V

Figure 7:
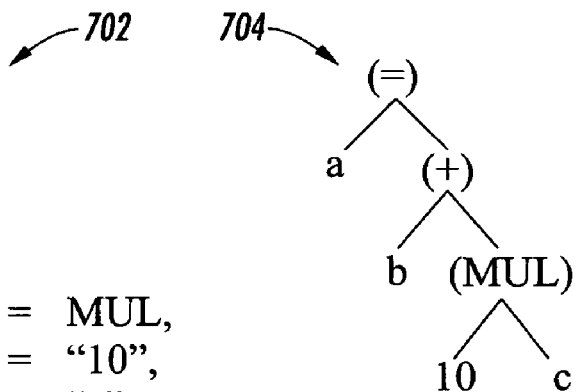

FIG. 7 illustrates the resulting binary tree syntactically at 702 and illustratively at 704 when the transformer B is applied to the binary tree shown in FIG. 5.

The composition of the transformers A and B is defined as:

$$A \circ B = \nabla x:\beta, y:\beta.y:=B(A(x))$$

Using the composition operator "else" defined in Section G above, the composition of the transformers A and B is defined as:

A∘B=$t_1$ else $t_2$ else V which is computationally equivalent to:

fix$T(x:\beta,y:\beta)$=[|

$x\#<label=\%$ "+", left=?l, right=
  ?r>⇒$y$:=<label=ADD, left=$T(l)$, right=$T(r)$>, $x\#<label=\%$ "*", left=?l, right=
  ?r>⇒$y$:=<label=MUL, left=$T(l)$, right=$T(r)$>, $x\#<label=?lab, left=?l, right=?r>⇒y$:=<label=lab,
  left=$T(l)$, right=$T(r)$>, $y$:=x|]

Figure 8:
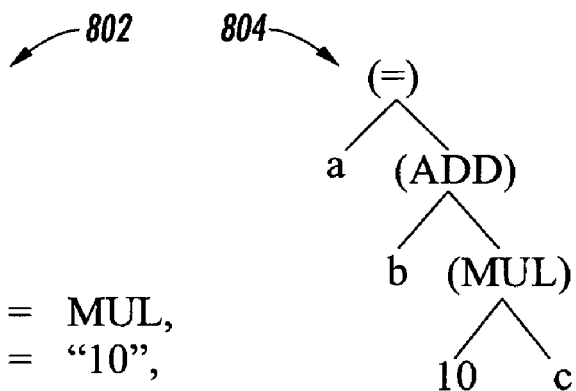
FIG. 8 illustrates the resulting binary tree syntactically and illustratively when the composition of two transformers is applied to the binary tree shown in FIG. 5.

FIG. 8 illustrates the resulting binary tree syntactically at 802 and illustratively at 804 when the composition of transformers A and B is applied to the binary tree shown in FIG. 5.

K. Miscellaneous

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

It will be appreciated that various other alternatives, modifications, variations, improvements or other such equivalents of the teachings herein that may be presently unforeseen, unappreciated or subsequently made by others are also intended to be encompassed by the claims.

The invention claimed is:

1. A method for composing programming abstractions, comprising:
   defining a composition operation for composing a first abstraction and a second abstraction with a selected composition operator; each abstraction having a form, a prefix, and at least one expression;
   unfolding the expressions from the first and the second abstractions by: (a) removing the prefix of each abstraction, and (b) substituting formal parameter names in each expression with a common parameter name to define open variables;
   transforming the unfolded expressions to a reduced expression using a composition pattern that tunes semantics of the selected composition operator;
   selecting a prefix that depends on the selected composition operator and the form of the first abstraction and the second abstraction; the selected prefix having a formal parameter with a type; and
   nesting the reduced expression in a third abstraction that composes the first abstraction and the second abstraction by: (i) appending the selected prefix to the reduced expression, (ii) binding the open variables of the reduced expression to the formal parameter of the selected prefix, and (iii) computing the type of the formal parameter of the selected prefix.

2. The method according to claim 1, wherein the selected composition operator applies to operands that comprise at least one recursive functional abstraction.

3. The method according to claim 1, wherein the selected composition operator is ⊡as defined by:

$$(z\ \text{fresh}) \frac{E \langle e_1[z/x_1] \rangle \cdots \langle e_n[z/x_n] \rangle \twoheadrightarrow \circ e}{\boxed{\text{E}}_E^* (\lambda x_1:t_1 \cdot e_1, \ldots, \lambda x_n:t_n \cdot e_n) \to \lambda z:t^x \cdot e} [c1]$$

where:
"$\lambda x_n:t_n.e_n$" is a lambda abstraction with prefix "$\lambda x:t$", in which "$\lambda$" identifies a form of abstraction, "x" identifies a formal parameter of type "t", and "e" is the expression of the abstraction;
"e[z/x]" means substitute $x_n$ for z in the expression $e_n$,
"$\twoheadrightarrow\circ$" means the terminal form of an operation reduces to a value,
"⊗" identifies a type combination relation,
"$e_1 \langle e_2 \rangle$" defines a lazy application in which the expression $e_2$ is passed by a function without first being computed,
"E" is a composition pattern.

4. The method according to claim 3, wherein the selected composition operator ⊡applies to operands that comprise at least one recursive functional abstraction.

5. The method according to claim 1, wherein the selected composition operator is ⊠as defined by:

$$(f\ \text{fresh})^{\boxtimes}(\lambda x:t.e) \to \text{fix}\ f(x:t)=f(e) \qquad [c3]$$

where:
"$\lambda x:t.e$" is a lambda abstraction with prefix "$\lambda x:t$", in which "$\lambda$" identifies a form of abstraction, "x" identifies a formal parameter of type "t", and "e" is the expression of the abstraction;
"f" is the logical name of a function; and
"fix" identifies that the expression "e" is recursive, to permit use of itself through the logical name "f".

6. The method according to claim 1, wherein the selected composition operator is ⋆as defined by:

$$t_1' \star t_2 \neq \bot \frac{\Phi_E(e_1[x/y_1], e_2[x/x_2]) \twoheadrightarrow \circ e}{\boxed{\text{⊡}}_E^* (\nabla x_1:t_1, y_1:t_1' \cdot e_1, \nabla x_2:t_2, y_2:t_2' \cdot e_2) \to} [c6]$$

$$\nabla x_1:t_1, y_2:t_2' \cdot \text{var} x = init(t_1' \star t_2) \cdot e$$

where:
"$\nabla x:t,y:t'.e$" is a nabla abstraction with prefix "$\nabla x:t,y:t'$", in which "$\nabla$" identifies a form of abstraction, "x" and "y" identify a parameter of type "t" and "t'" respectively, and "e" is the expression of the abstraction;
"$\Phi$" is a parametric function that performs a syntactic transformation of n terms into a new term;
"E" is a composition pattern.

7. The method according to claim 1, wherein the selected composition operator is ⋆as defined by:

$$\frac{\Phi_{Iter}(e) \twoheadrightarrow \circ e'}{\boxtimes (\nabla x:t, y:t' \cdot e) \to \nabla x:t, y:t' \cdot e'} [c7]$$

where:
"$\nabla x:t,y:t'.e$" is a nabla abstraction with prefix "$\nabla x:t,y:t'$", in which "$\nabla$" identifies a form of abstraction, "x" and "y" identify a parameter of type "t" and "t'" respectively, and "e" is the expression of the abstraction; and
"$\Phi$" is a parametric function that performs a syntactic transformation of n terms into a new term.

8. The method according to claim 7, wherein the selected composition operator ⋆applies to a recursive nabla abstraction.

9. The method according to claim 1, wherein the selected composition operator is ⋆as defined by:

$$\frac{}{\boxtimes (\nabla x:t, y:t' \cdot e) \to \nabla y:t', x:t.e} [c9]$$

where:
"$\nabla x:t,y:t'.e$" is a nabla abstraction with prefix "$\nabla x:t,y:t'$", in which "$\nabla$" identifies a form of abstraction, "x" and "y" identify a parameter of type "t" and "t'" respectively, and "e" is the expression of the abstraction.

10. The method according to claim 9, wherein the selected composition operator ⋆applies to a recursive nabla abstraction.

11. An apparatus for composing programming abstractions, comprising:
   means for defining a composition operation for composing a first abstraction and a second abstraction with a selected composition operator; each abstraction having a form, a prefix, and at least one expression;
   means for unfolding the expressions from the first and the second abstractions by: (a) removing the prefix of each abstraction, and (b) substituting formal parameter names in each expression with a common parameter name to define open variables;

means for transforming the unfolded expressions to a reduced expression using a composition pattern that tunes semantics of the selected composition operator;

means for selecting a prefix that depends on the selected composition operator and the form of the first abstraction and the second abstraction; the selected prefix having a formal parameter with a type; and means for nesting the reduced expression in a third abstraction that composes the first abstraction and the second abstraction by: (i) appending the selected prefix to the reduced expression, (ii) binding the open variables of the reduced expression to the formal parameter of the selected prefix, and (iii) computing the type of the formal parameter of the selected prefix.

12. The apparatus according to claim 11, wherein the selected composition operator applies to operands that comprise at least one recursive functional abstraction.

13. The apparatus according to claim 11, wherein the selected composition operator is ⊠as defined by:

$$(z \text{ fresh}) \frac{E(\!| e_1[z/x_1] |\!) \cdots (\!| e_n[z/x_n] |\!) \twoheadrightarrow \circ e}{\boxdot_E^\otimes (\lambda x_1{:}t_1 \cdot e_1, \ldots, \lambda x_n{:}t_n \cdot e_n) \to \lambda z{:}t^x \cdot e} [c1]$$

where:
"$\lambda x_n{:}t_n.e_n$" is a lambda abstraction with prefix "$\lambda\ x{:}t$", in which "$\lambda$" identifies a form of abstraction, "x" identifies a formal parameter of type "t", and "e" is the expression of the abstraction;

"$e_n[z/x_n]$" means substitute $x_n$ for z in the expression $e_n$,

"$\twoheadrightarrow\circ$" means the terminal form of an operation reduces to a value, "$\otimes$" identifies a type combination relation, "$e_1(\!|e_2|\!)$" defines a lazy application in which the expression $e_2$ is passed by a function without first being computed, "E" is a composition pattern.

14. The apparatus according to claim 13, wherein the selected composition operator ⊠applies to operands that comprise at least one recursive functional abstraction.

15. The apparatus according to claim 11, wherein the selected composition operator is 𝐘as defined by:

$$(f \text{ fresh}) \mathbf{Y}(\lambda x{:}t.e) \to \text{fix } f(x{:}t)=f(e) \quad [c3]$$

where:
"$\lambda x{:}t.e$" is a lambda abstraction with prefix "$\lambda x{:}t$", in which "$\lambda$" identifies a form of abstraction, "x" identifies a formal parameter of type "t", and "e" is the expression of the abstraction;

"f" is the logical name of a function; and

"fix" identifies that the expression "e" is recursive, to permit use of itself through the logical name "f".

16. The apparatus according to claim 11, wherein the selected composition operator is ⋞as defined by:

$$t'_1 \star t_2 \ne \perp \frac{\Phi_E(e_1[x/y_1], e_2[x/x_2]) \twoheadrightarrow \circ e}{\boxdot_E^*(\nabla x_1{:}t_1, y_1{:}t'_1 \cdot e_1, \nabla x_2{:}t_2, y_2{:}t'_2 \cdot e_2) \to} [c6]$$

$$\nabla x_1{:}t_1, y_2{:}t'_2 \cdot \text{varx} = \text{init}(t'_1 \star t_2) \cdot e$$

where:
"$\nabla x{:}t, y{:}t'.e$" is a nabla abstraction with prefix "$\nabla x{:}t,y{:}t'$", in which "$\nabla$" identifies a form of abstraction, "x" and "y" identify a parameter of type "t" and "t'" respectively, and "e" is the expression of the abstraction;

"$\Phi$" is a parametric function that performs a syntactic transformation of n terms into a new term;

"E" is a composition pattern.

17. The apparatus according to claim 11, wherein the selected composition operator is ⋞as defined by:

$$\frac{\Phi_{Iter}(e) \twoheadrightarrow \circ e'}{\boxtimes (\nabla x{:}t, y{:}t' \cdot e) \to \nabla x{:}t, y{:}t' \cdot e'} [c7]$$

where:
"$\nabla x{:}t,y{:}t'.e$" is a nabla abstraction with prefix "$\nabla x{:}t,y{:}t'$", in which "$\nabla$" identifies a form of abstraction, "x" and "y" identify a parameter of type "t" and "t'" respectively, and "e" is the expression of the abstraction; and "$\Phi$" is a parametric function that performs a syntactic transformation of n terms into a new term.

18. The apparatus according to claim 11, wherein the selected composition operator is ⋞as defined by:

$$\boxtimes(\nabla x{:}t, y{:}t'.e) \to \nabla y{:}t', x{:}t.e \quad [c9]$$

where:
"$\nabla x{:}t,y{:}t'.e$" is a nabla abstraction with prefix "$\nabla x{:}t,y{:}t'$", in which "$\nabla$" identifies a form of abstraction, "x" and "y" identify a parameter of type "t" and "t'" respectively, and "e " is the expression of the abstraction.

19. An article of manufacture for use in a machine, comprising:

a memory;

instructions stored in the memory for composing programming abstractions comprising:

defining a composition operation for composing a first abstraction and a second abstraction with a selected composition operator; each abstraction having a form, a prefix, and at least one expression;

unfolding the expressions from the first and the second abstractions by: (a) removing the prefix of each abstraction, and (b) substituting formal parameter names in each expression with a common parameter name to define open variables;

transforming the unfolded expressions to a reduced expression using a composition pattern that tunes semantics of the selected composition operator;

selecting a prefix that depends on the selected composition operator and the form of the first abstraction and the second abstraction; the selected prefix having a formal parameter with a type; and nesting the reduced expression in a third abstraction that composes the first abstraction and the second abstraction by: (i) appending the selected prefix to the reduced expression, (ii) binding the open variables of the reduced expression to the formal parameter of the selected prefix, and (iii) computing the type of the formal parameter of the selected prefix.

20. The article of manufacture according to claim 19, wherein the selected composition operator applies to operands that comprise at least one recursive functional abstraction.

* * * * *